(12) United States Patent
Wu et al.

(10) Patent No.: US 12,487,664 B2
(45) Date of Patent: Dec. 2, 2025

(54) EYE TRACKING AND GAZE ESTIMATION USING OFF-AXIS CAMERA

(71) Applicant: Magic Leap, Inc., Plantation, FL (US)

(72) Inventors: Zhengyang Wu, Bellewue, WA (US); Srivignesh Rajendran, San Francisco, CA (US); Tarrence van As, New York, NY (US); Joelle Zimmermann, Los Angeles, CA (US); Vijay Badrinarayanan, Mountain View, CA (US); Andrew Rabinovich, San Francisco, CA (US)

(73) Assignee: Magic Leap, Inc., Plantation, FL (US)

( * ) Notice: Subject to any disclaimer, the term of this patent is extended or adjusted under 35 U.S.C. 154(b) by 455 days.

(21) Appl. No.: 17/674,724

(22) Filed: Feb. 17, 2022

(65) Prior Publication Data

US 2022/0244781 A1 Aug. 4, 2022

Related U.S. Application Data

(63) Continuation of application No. PCT/US2020/047046, filed on Aug. 19, 2020.

(Continued)

(51) Int. Cl.
*G06F 3/01* (2006.01)
*G02B 27/00* (2006.01)
(Continued)

(52) U.S. Cl.
CPC ......... *G06F 3/013* (2013.01); *G02B 27/0093* (2013.01); *G06V 10/267* (2022.01);
(Continued)

(58) Field of Classification Search
CPC . G06F 3/013; G02B 27/0093; G02B 27/0172; G02B 2027/0138; G02B 27/017;
(Continued)

(56) References Cited

U.S. PATENT DOCUMENTS

| | | |
|---|---|---|
| 8,878,749 B1 | 11/2014 | Wu et al. |
| 11,775,058 B2 | 10/2023 | Badrinarayanan et al. |
| 2013/0050070 A1 | 2/2013 | Lewis et al. |
| 2015/0178939 A1 | 6/2015 | Bradski et al. |
| 2015/0346495 A1 | 12/2015 | Welch et al. |
| 2016/0026253 A1 | 1/2016 | Bradski et al. |

(Continued)

FOREIGN PATENT DOCUMENTS

| | | |
|---|---|---|
| CN | 106133648 A | 11/2016 |
| CN | 106503654 A | 3/2017 |

(Continued)

OTHER PUBLICATIONS

"General Theory of Remote Gaze Estimation Using the Pupil Center and Corneal Reflections," Elias Daniel Guestrin and Moshe Eizenman, IEEE Transactions on Biomedical Engineering vol. 53, No. 6 p. 1124-1133 (Year: 2006).*

(Continued)

*Primary Examiner* — Jennifer Mehmood
*Assistant Examiner* — Heath E. Wells
(74) *Attorney, Agent, or Firm* — KILPATRICK TOWNSEND & STOCKTON LLP

(57) ABSTRACT

Techniques related to the computation of gaze vectors of users of wearable devices are disclosed. A neural network may be trained through first and second training steps. The neural network may include a set of feature encoding layers and a plurality of sets of task-specific layers that each operate on an output of the set of feature encoding layers. During the first training step, a first image of a first eye may be provided to the neural network, eye segmentation data may be generated using the neural network, and the set of feature encoding layers may be trained. During the second training step, a second image of a second eye may be provided to the neural network, network output data may be generated using the neural network, and the plurality of sets of task-specific layers may be trained.

14 Claims, 19 Drawing Sheets

Related U.S. Application Data

(60) Provisional application No. 62/935,584, filed on Nov. 14, 2019, provisional application No. 62/926,241, filed on Oct. 25, 2019, provisional application No. 62/888,953, filed on Aug. 19, 2019.

(51) Int. Cl.
*G02B 27/01* (2006.01)
*G06V 10/26* (2022.01)
*G06V 10/774* (2022.01)
*G06V 10/82* (2022.01)
*G06V 40/18* (2022.01)

(52) U.S. Cl.
CPC ............ *G06V 10/774* (2022.01); *G06V 10/82* (2022.01); *G06V 40/193* (2022.01); *G06V 40/197* (2022.01); *G02B 2027/0138* (2013.01); *G02B 27/0172* (2013.01)

(58) Field of Classification Search
CPC .... G06V 10/267; G06V 10/774; G06V 10/82; G06V 40/193; G06V 40/197; G06V 2201/03; G06N 3/045; G06N 3/084
USPC .......................................................... 382/103
See application file for complete search history.

(56) References Cited

U.S. PATENT DOCUMENTS

| | | | |
|---|---|---|---|
| 2016/0202756 A1 | 7/2016 | Wu | |
| 2017/0119298 A1 | 5/2017 | Cheung | |
| 2018/0053056 A1 | 2/2018 | Rabinovich et al. | |
| 2018/0089834 A1* | 3/2018 | Spizhevoy | G06V 40/193 |
| 2018/0137335 A1* | 5/2018 | Kim | G06V 40/19 |
| 2018/0157892 A1* | 6/2018 | Han | G06N 3/084 |
| 2018/0181809 A1 | 6/2018 | Ranjan et al. | |
| 2018/0300897 A1 | 10/2018 | Woods et al. | |
| 2019/0073533 A1 | 3/2019 | Chen et al. | |
| 2019/0213434 A1* | 7/2019 | Zamfir | G06V 40/165 |
| 2019/0244108 A1 | 8/2019 | Meyerson et al. | |
| 2019/0295287 A1 | 9/2019 | De Villers-Sidani et al. | |
| 2019/0302883 A1 | 10/2019 | Greer et al. | |
| 2019/0303722 A1 | 10/2019 | Linden | |
| 2020/0202561 A1* | 6/2020 | Liu | G06T 7/73 |
| 2020/0348755 A1* | 11/2020 | Gebauer | G06F 3/013 |
| 2021/0049410 A1 | 2/2021 | Dierkes et al. | |
| 2021/0182554 A1 | 6/2021 | Badrinarayanan et al. | |
| 2022/0100268 A1* | 3/2022 | Weinberg | G06N 20/00 |
| 2022/0197376 A1* | 6/2022 | Boyle | H04N 23/74 |

FOREIGN PATENT DOCUMENTS

| | | |
|---|---|---|
| CN | 108073889 A | 5/2018 |
| CN | 108809522 A | 11/2018 |
| CN | 109274812 A | 1/2019 |
| CN | 112400148 A | 2/2021 |
| EP | 3811182 A | 4/2021 |
| JP | 2016106668 A | 6/2016 |
| JP | 2017211891 A | 11/2017 |
| WO | 2018000020 A1 | 1/2018 |
| WO | 2018035531 A1 | 2/2018 |
| WO | 2018039269 A1 | 3/2018 |
| WO | 2018063451 A1 | 4/2018 |
| WO | 2019147677 A1 | 8/2019 |
| WO | 2019246613 A1 | 12/2019 |

OTHER PUBLICATIONS

A free geometry model-independent neural eye-gaze tracking system, by Massimo Gneo, Maurizio Schmid, Silvia Conforto, Tommaso D'Alessio, pub Journal of Neuro Engineering and Rehabilitation, 9, 82, Nov. 16, 2012 (Year: 2012).*

CN201980041066.6, "Office Action", Jan. 21, 2024, 7 pages. [no translation available].

JP2020570526, "Office Action" and English translation, Dec. 28, 2023, 5 pages.

Bengio, "Learning Deep Architectures for AI", Foundations and Trends in Machine Learning, vol. 2, No. 1, 2009, pp. 1-127.

Application No. EP20853899.1, "Extended European Search Report", Sep. 9, 2022, 12 pages.

Playout et al., "A Novel Weakly Supervised Multitask Architecture for Retinal Lesions Segmentation on Fundus Images", IEEE Transactions on Medical Imaging, vol. 38, No. 10, Oct. 2019, pp. 2434-2444.

Playout et al., "A Novel Weakly Supervised Multitask Architecture for Retinal Lesions Segmentation on Fundus Images—Abstract", IEEE Transactions on Medical Imaging, vol. 38, No. 10 Available Online at : URL:https://pubmed.ncbi.nlm.nih.gov/30908197/, Oct. 2019, 1 page.

Application No. EP19821828.1, Extended European Search Report, Mailed on Jun. 28, 2021, 7 pages.

Application No. PCT/US2019/038693, International Preliminary Report on Patentability, mailed on Dec. 30, 2020, 10 pages.

Application No. PCT/US2019/038693, International Search Report and Written Opinion, mailed on Sep. 20, 2019, 7 pages.

Application No. PCT/US2020/047046, International Preliminary Report on Patentability, mailed on Mar. 3, 2022, 9 pages.

Application No. PCT/US2020/047046, International Search Report and Written Opinion, mailed on Nov. 9, 2020, 10 pages.

OpenCV: cv::SimpleBlobDetector Class Reference, 2D Features Framework/Feature Detection and Description, retrieved from internet: https://docs.opencv.org/3.4/20/d7a/classcv_1_1SimpleBlobDeterctor.html, on Aug. 19, 2019, 2 pages.

Kitazumi et al., "Pupil Detection from Visible Light Corneal Image Using Deep Learning and Application to Gaze Estimation", IPSJ SIG Technical Report, Computer Vision and Image Media (CVIM), Jan. 11, 2018, 8 pages. [English Abstract].

U.S. Appl. No. 17/129,669, "Notice of Allowance", Jun. 7, 2023, 9 pages.

European Patent Application No. 19821828.1, "Office Action", May 25, 2023, 7 pages.

Guestrin et al., "General Theory of Remote Gaze Estimation Using the Pupil Center and Corneal Reflections", IEEE Transactions on Biomedical Engineering, vol. 53, No. 6, Jun. 2006, pp. 1124-1133.

Japanese Patent Application No. 2020-570526, "Office Action" and English translation, Jun. 30, 2023, 10 pages.

U.S. Appl. No. 17/129,669, "Non-Final Office Action", Feb. 15, 2023, 10 pages.

JP 2022-510817, "Office Action", Jun. 17, 2024, 3 pages. [no translation available].

Matsui et al., "Simultaneous Estimation of Facial Landmark and Attributes with Separation Multi-task Networks", International Conference on Computer Vision Theory and Applications, Feb. 27, 2019, 8 pages.

Matsui et al., "Simultaneous estimation of facial organ points and face attributes by Separation Multi-tasks Networks", The Institute of Electronics, Information and Communication Engineers, vol. 118, No. 362, Technical research report, Japanese, Dec. 6, 2018, Dec. 6, 2018, pp. 39-44. [English version published on Feb. 27, 2019, is attached herewith as a separate reference].

EP20853899.1, "Office Action", Dec. 4, 2024, 10 pages.

CN201980041066.6, "Notice of Decision to Grant", Oct. 30, 2024, 4 pages. [no translation available].

CN202080059575.4, "Office Action", Sep. 23, 2024, 10 pages. [no translation available].

CN202080059575.4, "Office Action", Dec. 12, 2024, 13 pages. [no translation available].

Vandenhende et al., "Branched Multi-Task Networks: Deciding What Layers to Share", [MTL] Branched Multi-Task Networks, Jun. 11, 2019, pp. 1-7.

CN202080059575.4, "Office Action and English translation", Feb. 18, 2025, 16 pages.

CN202080059575.4, "Office Action and English translation", Apr. 23, 2025, 20 pages.

(56) References Cited

OTHER PUBLICATIONS

CN202080059575.4, "Notice of Decision to Grant" and English translation, Aug. 27, 2025, 8 pages.
EP19821828.1, "Office Action", Jun. 5, 2025, 5 pages.

* cited by examiner

EYE TRACKING AND GAZE ESTIMATION USING OFF-AXIS CAMERA

CROSS-REFERENCES TO RELATED APPLICATIONS

This application is a continuation of International Patent Application No. PCT/US2020/047046, filed Aug. 19, 2020, entitled "EYE TRACKING AND GAZE ESTIMATION USING OFF-AXIS CAMERA," which claims the benefit of and priority to U.S. Provisional Application No. 62/888,953, filed on Aug. 19, 2019, titled "EYENET: A MULTI-TASK DEEP NETWORK FOR OFF-AXIS EYE GAZE ESTIMATION AND SEMANTIC USER UNDERSTANDING," U.S. Provisional Application No. 62/926,241, filed on Oct. 25, 2019, titled "METHOD AND SYSTEM FOR PERFORMING EYE TRACKING USING AN OFF-AXIS CAMERA," and U.S. Provisional Application No. 62/935,584, filed on Nov. 14, 2019, titled "METHOD AND SYSTEM FOR PERFORMING EYE TRACKING USING AN OFF-AXIS CAMERA," the contents of which are incorporated by reference in their entirety for all purposes.

BACKGROUND OF THE INVENTION

Modern computing and display technologies have facilitated the development of systems for so called "virtual reality" or "augmented reality" experiences, wherein digitally reproduced images or portions thereof are presented to a user in a manner wherein they seem to be, or may be perceived as, real. A virtual reality, or "VR," scenario typically involves presentation of digital or virtual image information without transparency to other actual real-world visual input; an augmented reality, or "AR," scenario typically involves presentation of digital or virtual image information as an augmentation to visualization of the actual world around the user.

Despite the progress made in these display technologies, there is a need in the art for improved methods, systems, and devices related to augmented reality systems, particularly, display systems.

SUMMARY OF THE INVENTION

The present disclosure relates generally to systems and methods for eye tracking. More particularly, embodiments of the present disclosure provide systems and methods for performing eye tracking for gaze estimation in head-mounted virtual reality (VR), mixed reality (MR), and/or augmented reality (AR) devices. Embodiments of the present disclosure enable the use of energy and bandwidth efficient rendering of content to drive multi-focal displays in a manner that is effective and non-obtrusive to a user's needs. Although the present disclosure is described in reference to an AR device, the disclosure is applicable to a variety of applications in computer vision and image display systems.

A summary of the invention is provided in reference to a series of examples listed below. As used below, any reference to a series of examples is to be understood as a reference to each of those examples disjunctively (e.g., "Examples 1-4" is to be understood as "Examples 1, 2, 3, or 4").

Example 1 is a method of training a neural network having a set of feature encoding layers and a plurality of sets of task-specific layers that each operate on an output of the set of feature encoding layers, the method comprising: performing a first training step including: providing a first image of a first eye to the neural network; generating, using the neural network, eye segmentation data based on the first image, wherein the eye segmentation data includes a segmentation of the first eye into a plurality of regions; and training the set of feature encoding layers using the eye segmentation data; and performing a second training step including: providing a second image of a second eye to the neural network; generating, using the set of feature encoding layers and each of the plurality of sets of task-specific layers, network output data based on the second image; and training the plurality of sets of task-specific layers using the network output data.

Example 2 is the method of example(s) 1, wherein the first training step is performed during a first time duration and the second training step is performed during a second time duration that is after the first time duration.

Example 3 is the method of example(s) 1, wherein the plurality of regions includes one or more of a background region, a sclera region, a pupil region, or an iris region.

Example 4 is the method of example(s) 1, wherein performing the first training step further includes: training a single set of task-specific layers of the plurality of sets of task-specific layers using the eye segmentation data.

Example 5 is the method of example(s) 4, wherein the single set of task-specific layers is the only set of task-specific layers of the plurality of sets of task-specific layers that is trained during the first training step.

Example 6 is the method of example(s) 1, wherein performing the first training step further includes: receiving eye segmentation ground truth (GT) data; and comparing the eye segmentation data to the eye segmentation GT data.

Example 7 is the method of example(s) 1, wherein the set of feature encoding layers are not trained during the second training step.

Example 8 is the method of example(s) 1, wherein the network output data includes two-dimensional (2D) pupil data corresponding to the second eye.

Example 9 is the method of example(s) 1, wherein the network output data includes glint detection data corresponding to the second eye.

Example 10 is the method of example(s) 1, wherein the network output data includes cornea center data corresponding to the second eye.

Example 11 is the method of example(s) 1, wherein the network output data includes a blink prediction corresponding to the second eye.

Example 12 is the method of example(s) 1, wherein the network output data includes an eye expression classification corresponding to the second eye.

Example 13 is the method of example(s) 1, wherein the network output data includes second eye segmentation data that includes a second segmentation of the second eye into a second plurality of regions.

Example 14 is a non-transitory computer-readable medium comprising instructions that, when executed by one or more processors, cause the one or more processors to perform the methods of any of the examples 1 to 13.

Example 15 is a system comprising: one or more processors; and a non-transitory computer-readable medium comprising instructions that, when executed by the one or more processors, cause the one or more processors to perform the methods of any of the examples 1 to 13.

Example 16 is a method of training a neural network for classifying user eye expression, the method comprising: capturing an image of an eye; providing the image of the eye to the neural network; generating, using the neural network, an eye expression classification corresponding to the eye based on the image of the eye, wherein the eye expression classification is one of a plurality of possible eye expression classifications; determining a ground truth (GT) eye expression classification; computing error data based on a difference between the eye expression classification and the GT eye expression classification; and modifying the neural network based on the error data.

Example 17 is the method of example(s) 16, wherein the image of the eye is captured using a camera of a wearable display device.

Example 18 is the method of example(s) 16, wherein determining the GT eye expression classification includes: receiving user input indicating the GT eye expression classification.

Example 19 is the method of example(s) 16, wherein determining the GT eye expression classification includes: determining that an instruction that is communicated to a user indicates the GT eye expression classification.

Example 20 is the method of example(s) 16, further comprising: prior to capturing the image of the eye, communicating an instruction to a user that indicates the GT eye expression classification.

Example 21 is the method of example(s) 16, wherein modifying the neural network includes: modifying a set of weights of the neural network.

Example 22 is the method of example(s) 21, wherein the set of weights are modified using backpropagation.

Example 23 is the method of example(s) 16, wherein the neural network is modified based on a magnitude of the error data.

Example 24 is the method of example(s) 16, further comprising: outputting, by a plurality of infrared (IR) light-emitting diodes (LED), light toward the eye such that the image of the eye includes a plurality of glints.

Example 25 is the method of example(s) 16, wherein the image of the eye includes a plurality of glints produced by light outputted by a plurality of infrared (IR) light-emitting diodes (LED).

Example 26 is the method of example(s) 16, wherein the image of the eye does not include eyebrows of a user of the eye.

Example 27 is the method of example(s) 16, wherein the plurality of possible eye expression classifications include at least one of neutral, happy, discrimination, or sensitivity.

Example 28 is a non-transitory computer-readable medium comprising instructions that, when executed by one or more processors, cause the one or more processors to perform the methods of any of the examples 16 to 27.

Example 29 is a system comprising: one or more processors; and a non-transitory computer-readable medium comprising instructions that, when executed by the one or more processors, cause the one or more processors to perform the methods of any of the examples 16 to 27.

Example 30 is a method of training a neural network for computing a gaze vector, the method comprising: capturing an image of an eye; processing the image of the eye to produce an optical axis corresponding to the eye; providing the optical axis to the neural network; generating, using the neural network, the gaze vector corresponding to the eye based on the optical axis; determining gaze vector ground truth (GT) data; computing error data based on a difference between the gaze vector and the gaze vector GT data; and modifying the neural network based on the error data.

Example 31 is the method of example(s) 30, wherein the image of the eye is captured using a camera of a wearable display device.

Example 32 is the method of example(s) 30, wherein the gaze vector GT data is determined based on a location at which a target is displayed on a screen.

Example 33 is the method of example(s) 30, wherein determining the gaze vector GT data includes: receiving user input indicating the gaze vector GT data.

Example 34 is the method of example(s) 30, wherein determining the gaze vector GT data includes: determining that an instruction communicated to a user indicates the gaze vector GT data.

Example 35 is the method of example(s) 30, further comprising: prior to capturing the image of the eye, communicating an instruction to a user that indicates the gaze vector GT data.

Example 36 is the method of example(s) 30, further comprising: displaying a target at a location on a screen, wherein the gaze vector GT data is determined based on the location.

Example 37 is the method of example(s) 30, wherein modifying the neural network includes: modifying a set of weights of the neural network.

Example 38 is the method of example(s) 37, wherein the set of weights are modified using backpropagation.

Example 39 is the method of example(s) 30, wherein the neural network is modified based on a magnitude of the error data.

Example 40 is the method of example(s) 30, further comprising: outputting, by a plurality of infrared (IR) light-emitting diodes (LED), light toward the eye such that the image of the eye includes a plurality of glints.

Example 41 is the method of example(s) 30, wherein the image of the eye includes a plurality of glints produced by light outputted by a plurality of infrared (IR) light-emitting diodes (LED).

Example 42 is the method of example(s) 30, wherein the gaze vector includes at least one angle.

Example 43 is a non-transitory computer-readable medium comprising instructions that, when executed by one or more processors, cause the one or more processors to perform the methods of any of the examples 30 to 42.

Example 44 is a system comprising: one or more processors; and a non-transitory computer-readable medium comprising instructions that, when executed by the one or more processors, cause the one or more processors to perform the methods of any of the examples 30 to 42.

Numerous benefits are achieved by way of the present disclosure over conventional techniques. For example, eye gaze estimation and simultaneous understanding of the user, through eye images, enables energy and bandwidth efficient rendering of content (foveated rendering), drives multi-focal displays for more realistic rendering of content (minimizing accommodation vergence conflict), and provides an effective and non-obtrusive method for understanding user expressions. An additional benefit is that estimates using the trained network work well in conjunction with the classical eye tracking pipeline. It has been demonstrated that estimates using the trained network can be utilized in a geometric eye tracking system to improve its overall robustness and accuracy.

Additionally, results from the multi-stage eye tracking model described herein can drive other vital applications in AR/VR/MR. For example, cornea prediction can be used for foveated rendering, and eye segmentation is useful for rendering eyes in avatar based social suite apps. Although collecting gaze target GT data for a large number of subjects can be both inaccurate and difficult, data collection herein is made significantly simpler by decoupling the training of intermediate predictions (pupil and cornea estimation) from the final 3D gaze vector estimation pipeline. Because errors in end-to-end deep networks can be hard to interpret, intermediate estimates made in each stage using the trained network improve the interpretability. Other benefits of the present disclosure will be readily apparent to those skilled in the art.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

Eye gaze estimation and simultaneous semantic understanding of a user through eye images is an important component in virtual reality (VR) and mixed reality (MR); enabling energy efficient rendering, multi-focal displays, and effective interaction with 3D content. In head-mounted VR/MR devices, the eyes may be imaged off-axis to avoid blocking the user's gaze, which can make drawing eye related inferences very challenging. In various embodiments described herein, a single deep neural network is provided that solves multiple heterogeneous tasks related to eye gaze estimation and semantic user understanding for an off-axis camera setting. The tasks may include eye segmentation, blink detection, emotive expression classification, infrared radiation (IR) light-emitting diode (LED) glints detection, and pupil and cornea center estimation. To train the neural network end-to-end, both hand labeled supervision and model based supervision may be employed.

The process of estimating accurate gaze involves appearance-based computations (segmentation, key point detection, e.g., pupil centers, glints) followed by geometry-based computations (e.g., estimating cornea, pupil centers, and gaze vectors in three dimensions). Current eye trackers use classical computer vision techniques (without learning) to estimate the pupil boundary/center and then compute the gaze based on those estimates. Estimates using the trained network described herein are significantly more accurate than the classical techniques. According to some embodiments described herein, a single deep network is trained to jointly estimate multiple quantities relating to eye and gaze estimation for off-axis eye images.

Figure 1:
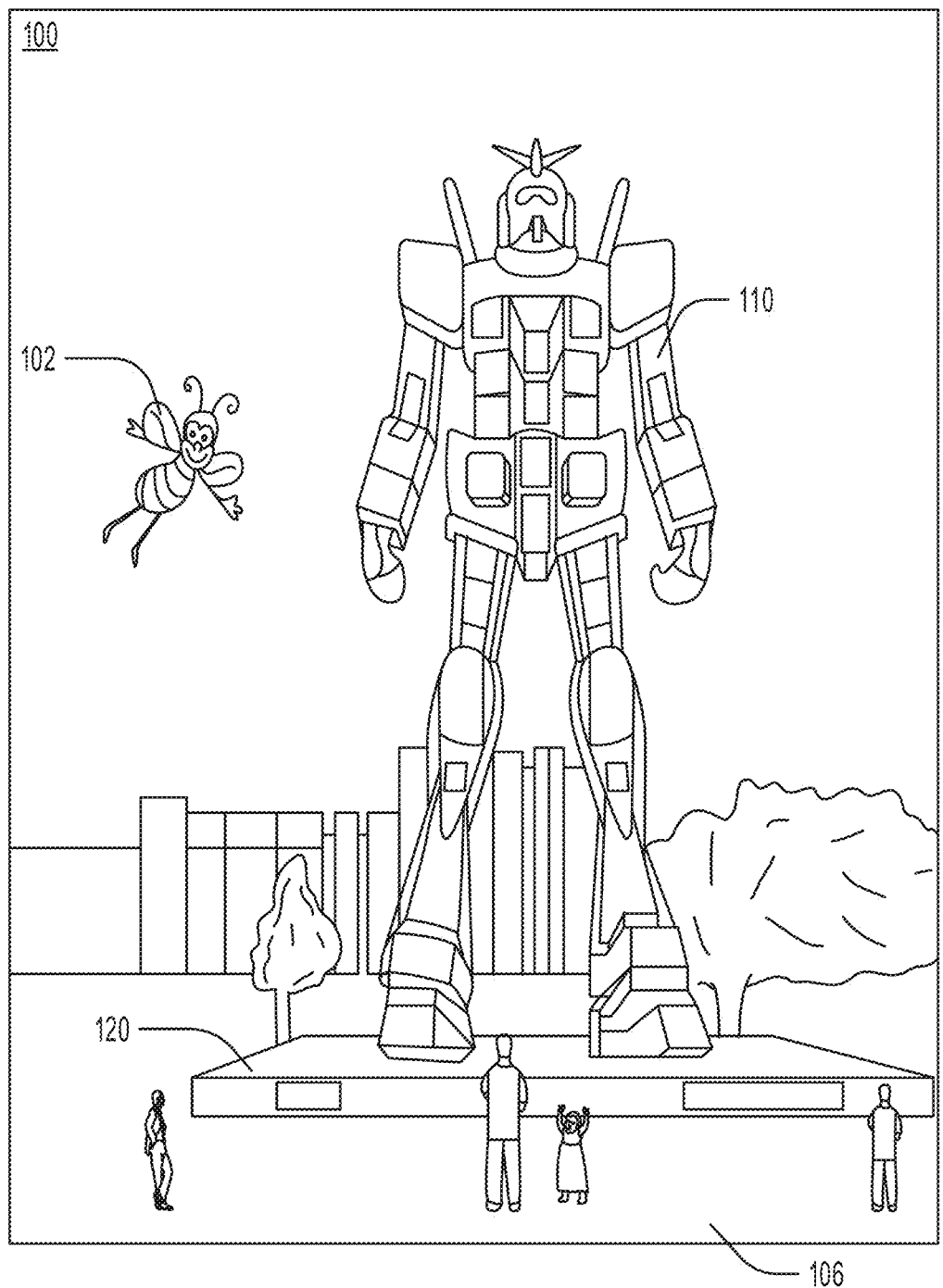
FIG. 1 illustrates an augmented reality (AR) scene as viewed through a wearable AR device.

FIG. 1 illustrates an augmented reality (AR) scene as viewed through a wearable AR device according to an embodiment described herein. An AR scene 100 is depicted wherein a user of an AR technology sees a real-world park-like setting 106 featuring people, trees, buildings in the background, and a concrete platform 120. In addition to these items, the user of the AR technology also perceives that he "sees" a robot statue 110 standing upon the real-world platform 120, and a cartoon-like avatar character 102 flying by, which seems to be a personification of a bumble bee, even though these elements (character 102 and statue 110) do not exist in the real world. Due to the extreme complexity of the human visual perception and nervous system, it is challenging to produce a VR or AR technology that facilitates a comfortable, natural-feeling, rich presentation of virtual image elements amongst other virtual or real-world imagery elements.

Figure 2:
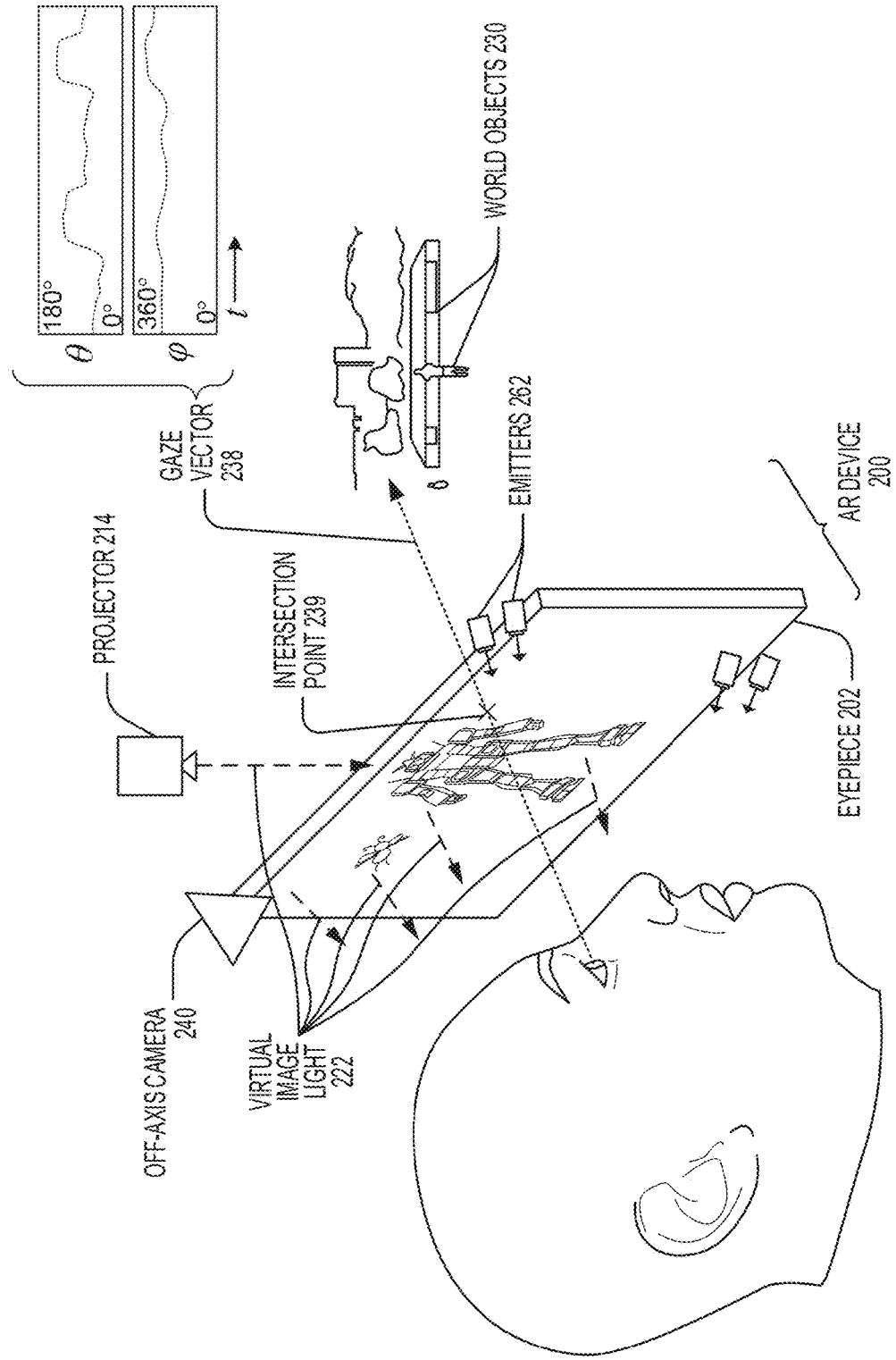
FIG. 2 illustrates various features of an AR device.

FIG. 2 illustrates various features of an AR device 200, according to some embodiments of the present disclosure. In some embodiments, AR device 200 may include a projector 214 configured to project virtual image light 222 (light associated with virtual content) onto an eyepiece 202 such that a user perceives one or more virtual objects (e.g., character 102 and statue 110) as being positioned at some location within the user's environment (e.g., at one or more depth planes). The user may perceive these virtual objects alongside world objects 230. AR device 200 may also include an off-axis camera 240 and one or more emitters 262 mounted to AR device 200 and directed toward an eye of the user. Emitters 262 may comprise IR LEDs that transmit light that is invisible to the eye of the user but is detectable by off-axis camera 240. In some embodiments, emitters 262 may comprise LEDs that transmit light that is visible to the eye of the user such that off-axis camera 240 need not have the capability to detect light in the IR spectrum. As such, off-axis camera 240 may be a camera with or without IR detection capabilities.

During operation of AR device 200, off-axis camera 240 may detect information (e.g., capture images) leading to the estimation of a gaze vector 238 corresponding to the eye of the user. Gaze vector 238 may be computed for each image frame and may, in various embodiments, be expressed as a two-dimensional (2D) or three-dimensional (3D) value. For example, as illustrated in FIG. 2, gaze vector 238 may be expressed using a spherical coordinate system by a polar angle θ and an azimuthal angle φ. Alternatively or additionally, gaze vector 238 may be expressed using a 3D Cartesian coordinate system by X, Y, and Z values. Gaze vector 238 may intersect with eyepiece 202 at an intersection point 239 that may be calculated based on the location of the eye of the user, the location of eyepiece 202, and gaze vector 238. In some instances, projector 214 may adjust virtual image light 222 to improve image brightness and/or clarity around intersection point 239 in relation to other areas of the field of view.

As illustrated, the set of four emitters 262 are placed in and around the display and their reflections (glints) are detected using off-axis camera 240. This setup is duplicated for the user's left eye. The detected glints are used to estimate important geometric quantities in the eye which are not directly observable from the eye camera images. As shown in FIG. 2, there can be a large angle between the user's gaze and the camera axis. This makes eye gaze estimation challenging due to the increased eccentricity of pupils, partial occlusions caused by the eyelids and eyelashes, as well as glint distractions caused due to environment illumination.

Figure 3:
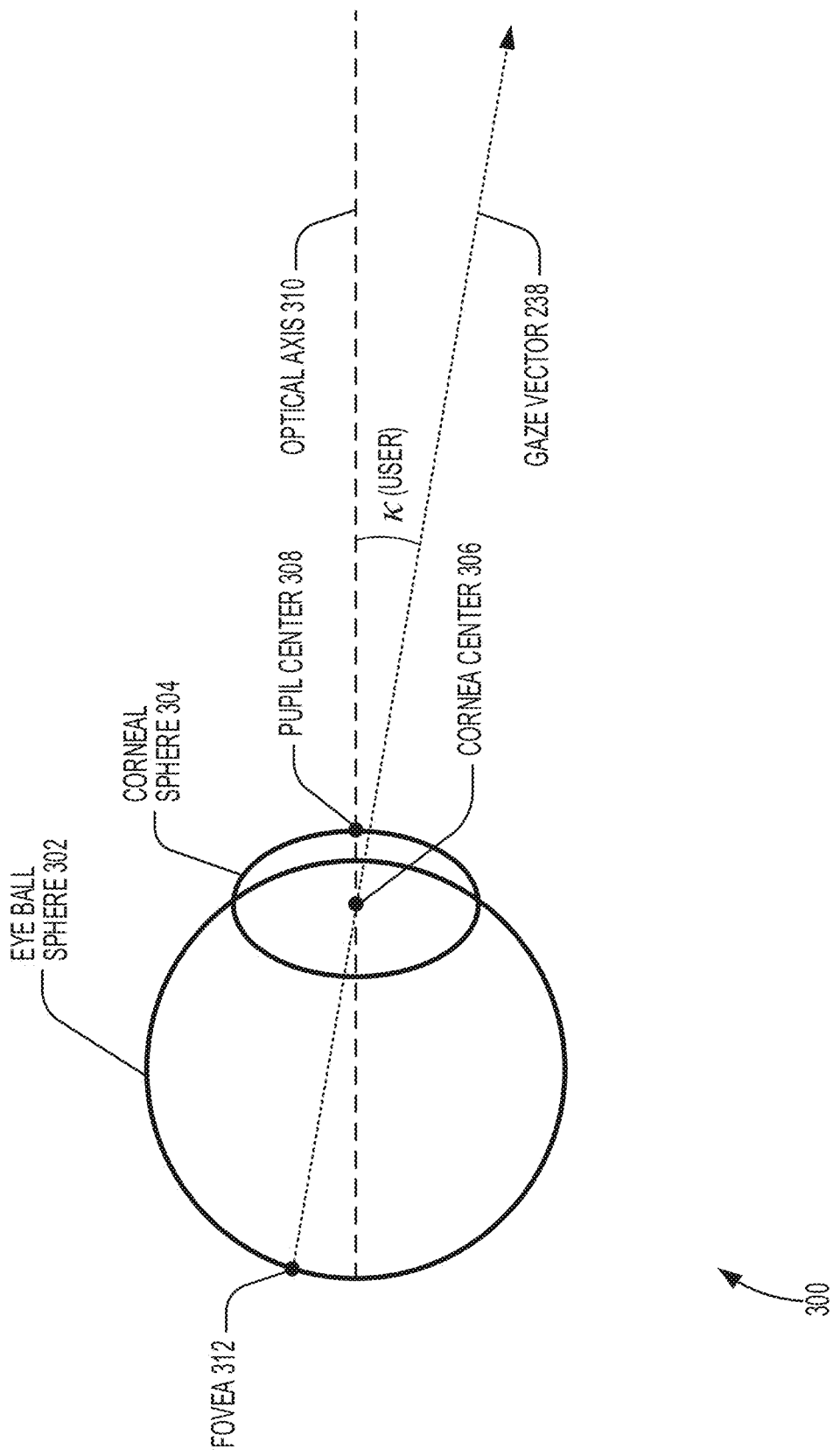
FIG. 3 illustrates a standard double spherical model of a human eye.

FIG. 3 illustrates a standard double spherical model 300 of the human eye. According to model 300, an eye ball sphere 302 may completely or partially encompass an inner corneal sphere 304. A cornea center 306 may be the geometric center of the corneal sphere 304. A pupil center 308 may correspond to the pupil opening or pupil center of the eye and may be encompassed by corneal sphere 304. An optical axis 310 of the eye may be a vector formed by connecting cornea center 306 and pupil center 308. Gaze vector 238 (alternatively referred to as the visual axis) may be formed by connecting cornea center 306 and a fovea 312 at the back of the eye. Because fovea 312 is generally unknown and difficult to estimate, gaze vector 238 may be computed using optical axis 310 and a user-specific calibration angle κ. Calibration angle κ may be a one-dimensional (1D), 2D, or 3D value and may be calibrated for a particular user during a calibration phase when AR device 200 is operated by that user for the first time. Once calibration angle K is computed for a particular user, it is assumed to be fixed. Accordingly, estimating optical axis 310 using cornea center 306 and pupil center 308 can be important underlying gaze tracking.

Figure 4:
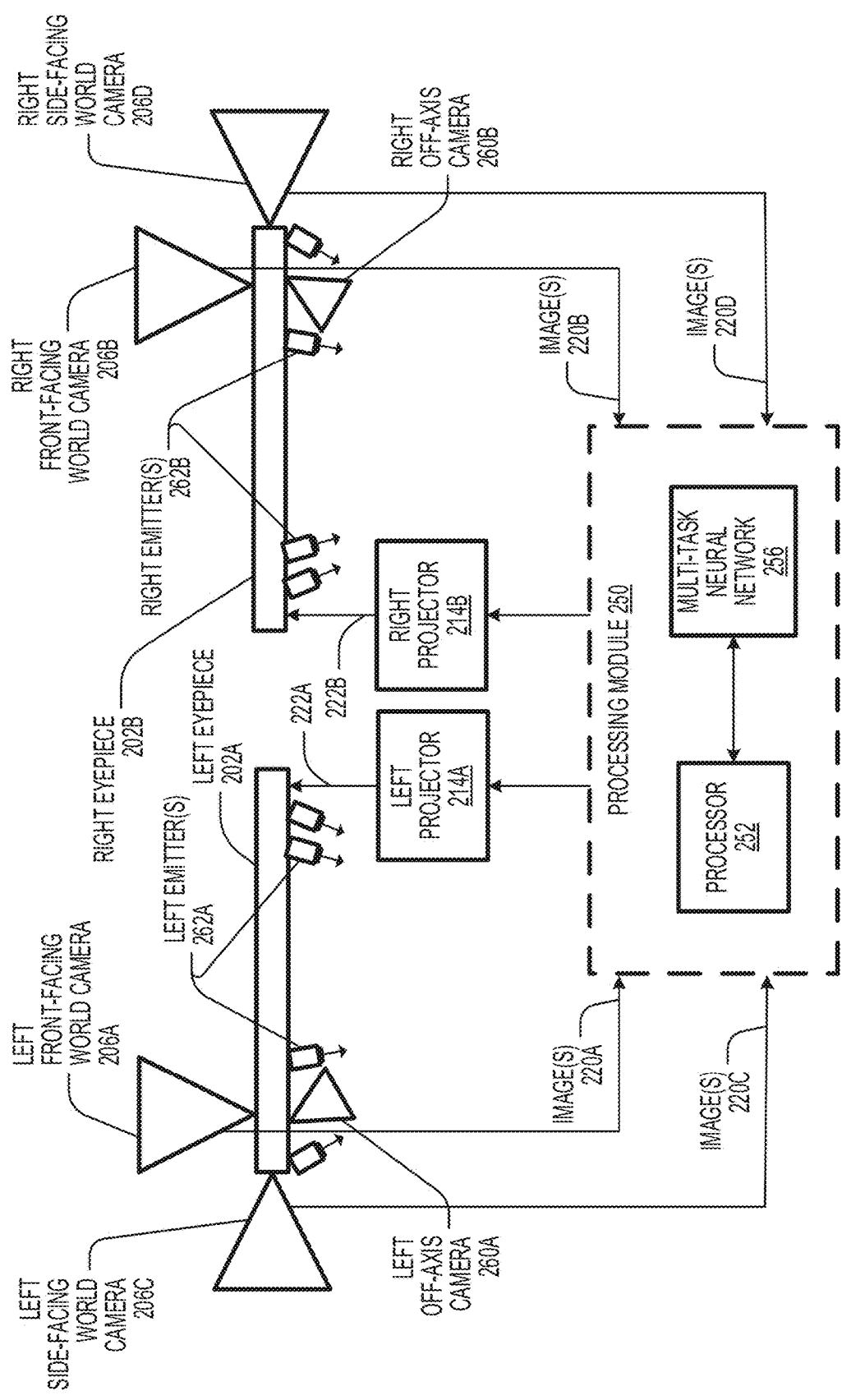
FIG. 4 illustrates a schematic view of an AR device.

FIG. 4 illustrates a schematic view of AR device 200, according to some embodiments of the present disclosure. AR device 200 may include a left eyepiece 202A, a right eyepiece 202B, a left front-facing world camera 206A attached directly on or near left eyepiece 202A, a right front-facing world camera 206B attached directly on or near right eyepiece 202B, a left side-facing world camera 206C, a right side-facing world camera 206D, and a processing module 250. Emitters 262 may be mounted to one or both of eyepieces 202 and may in some embodiments be separated into left emitters 262A mounted directly on or near left eyepiece 202A and right emitters 262B mounted directly on or near right eyepiece 202B (e.g., mounted to the frame of AR device 200). In some instances, AR device 200 may include a single or multiple off-axis cameras 260 such as a centrally positioned off-axis camera 260 or, as illustrated in FIG. 4, a left off-axis camera 260A mounted directly on or near left eyepiece 202A and a right off-axis camera 260A mounted directly on or near right eyepiece 202B.

Some or all of the components of AR device 200 may be head mounted such that projected images may be viewed by a user. In one particular implementation, all of the components of AR device 200 shown in FIG. 4 are mounted onto a single device (e.g., a single headset) wearable by a user. In another implementation, processing module 250 is physically separate from and communicatively coupled to the other components of AR device 200 by wired or wireless connectivity. For example, processing module 250 may be mounted in a variety of configurations, such as fixedly attached to a frame, fixedly attached to a helmet or hat worn by a user, embedded in headphones, or otherwise removably attached to a user (e.g., in a backpack-style configuration, in a belt-coupling style configuration, etc.).

Processing module 250 may comprise at least one processor 252 as well as associated digital memory, such as non-volatile memory (e.g., flash memory), both of which may be utilized to assist in the processing, caching, and storage of data. The data may include data captured from sensors (which may be, e.g., operatively coupled to AR device 200) such as image capture devices (e.g., cameras 206 and off-axis cameras 260), microphones, inertial measurement units, accelerometers, compasses, GPS units, radio devices, and/or gyros. For example, processing module 250 may receive image(s) 220 from cameras 206, or more specifically, left front image(s) 220A from left front-facing world camera 206A, right front image(s) 220B from right front-facing world camera 206B, left side image(s) 220C from left side-facing world camera 206C, and right side image(s) 220D from right side-facing world camera 206D. In some embodiments, image(s) 220 (or those received from off-axis cameras 260) may include a single image, a pair of images, a video comprising a stream of images, a video comprising a stream of paired images, and the like. Image(s) 220 (or those received from off-axis cameras 260) may be periodically generated and sent to processing module 250 while AR device 200 is powered on, or may be generated in response to an instruction sent by processing module 250 to one or more of the cameras.

In some embodiments, the functionality of processing module 250 may be implemented by two or more sets of electronic hardware components (e.g., sets of one or more processors, storage devices, etc.) that are housed separately but communicatively coupled. For example, the functionality of processing module 250 may be carried out by electronic hardware components housed within a headset in conjunction with electronic hardware components housed within a computing device physically tethered to the headset, one or more electronic devices within the environment of the headset (e.g., smart phones, computers, peripheral devices, smart appliances, etc.), one or more remotely-located computing devices (e.g., servers, cloud computing devices, etc.), or a combination thereof.

Eyepieces 202A and 202B may comprise transparent or semi-transparent waveguides configured to direct light from projectors 214A and 214B, respectively. Specifically, processing module 250 may cause left projector 214A to output left virtual image light 222A onto left eyepiece 202A, and may cause right projector 214B to output right virtual image light 222B onto right eyepiece 202B. In some embodiments, each of eyepieces 202 may each comprise a plurality of waveguides corresponding to different colors and/or different depth planes.

Cameras 206A and 206B may be positioned to capture images that substantially overlap with the field of view of a user's left and right eyes, respectively. Accordingly, placement of cameras 206A and 206B may be near a user's eyes but not so near as to obscure the user's field of view. Alternatively or additionally, cameras 206A and 206B may be positioned so as to align with the incoupling locations of virtual image light 222A and 222B, respectively. Cameras 206C and 206D may be positioned to capture images to the side of a user, e.g., in a user's peripheral vision or outside the user's peripheral vision. Image(s) 220C and 220D captured using cameras 206C and 206D need not necessarily overlap with image(s) 220A and 220B captured using cameras 206A and 206B. Cameras 260A and 260B may be positioned to captures images of the user's left and right eyes, respectively. Images captured by cameras 260 may show the user's eyes in their entirety or some portion of the user's eyes.

During operation of AR device 200, processing module 250 may use a multi-task neural network 256 to compute gaze vector 238. In some embodiments, multi-task neural network 256 may be stored in non-transitory memory associated with or otherwise accessible to the at least one processor 252 of processing module 250. Multi-task neural network 256 may be an artificial neural network, a convolutional neural network, or any type of computing system that can "learn" progressively by processing examples. For example, multi-task neural network 256 may be trained by processing manually prepared training data that represents ground truth (GT) data. After processing each piece of the training data, multi-task neural network 256 is able to generate outputs that more closely approximate the GT data.

In some embodiments, multi-task neural network 256 comprises a collection of connected nodes that are capable of transmitting signals from one to another. For example, multi-task neural network 256 may include several different layers of such nodes. As described in further detail below, in some embodiments, multi-task neural network 256 may include encoder layers and decoder layers. In some embodiments, one or more encoder layers of multi-task neural network 256 may be stored in non-transitory memory associated with a first set of one or more processors, while one or more decoder layers of multi-task neural network 256 may be stored in non-transitory memory associated with a second set of one or more processors that are housed separately from but communicatively coupled to the first set of one or more processors. For example, the first set of one or more processors may include one or more processors that are housed within a headset, while the second set of one or more processors may include one or more processors that are housed within a computing device that is physically tethered to the headset, one or more electronic devices that are physically separate from the headset (e.g., smart phones, computers, peripheral devices, servers, cloud computing devices, etc.), or a combination thereof. The training and usage of multi-task neural network 256 is described further below.

Figure 5:
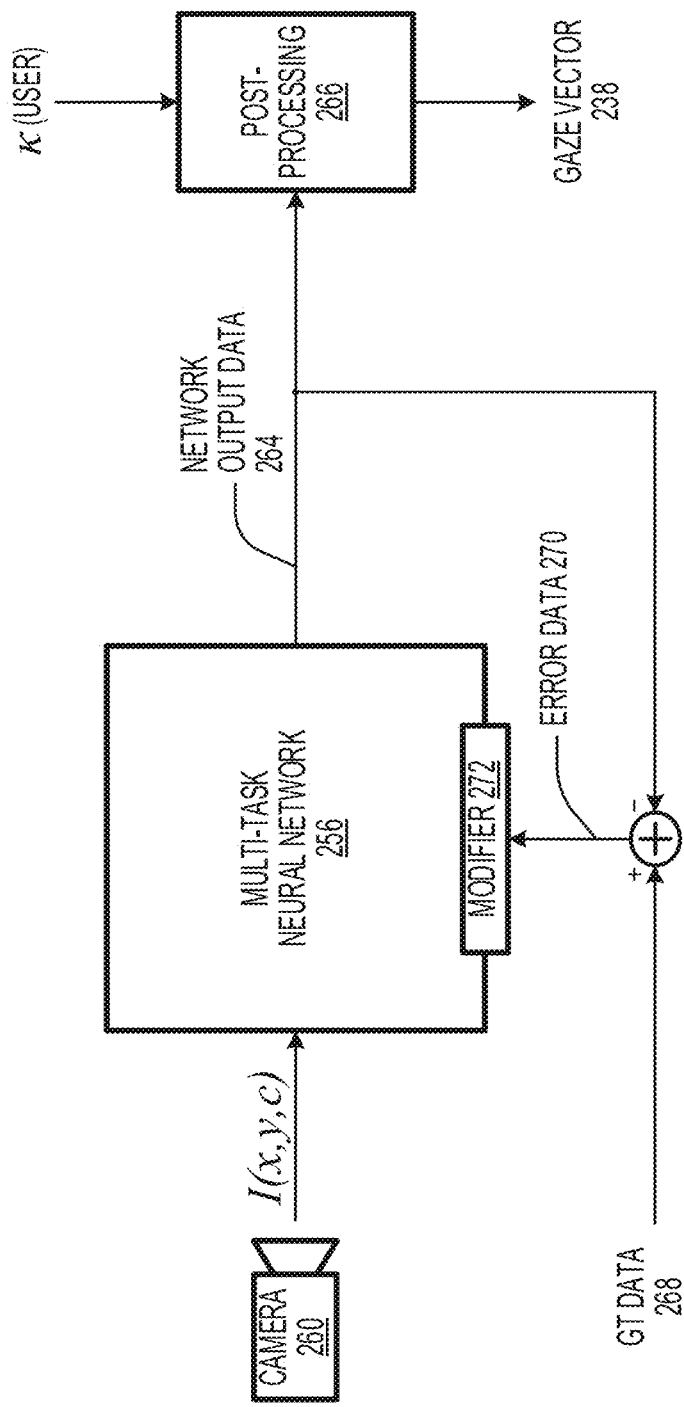
FIG. 5 illustrates a schematic view of a system for computing a gaze vector that incorporates a multi-task neural network.

FIG. 5 illustrates a schematic view of a system for computing a gaze vector that incorporates multi-task neural network 256. In some embodiments, an input image I(x,y,c) is captured by off-axis camera 260 and is provided as input to multi-task neural network 256. Input image I(x,y,c) may have dimensions of H×W×C where H is the number of pixels in the vertical direction, W is the number of pixels in the horizontal direction, and C is the number of channels of the image (e.g., equal to 3 for RGB images and 1 for grayscale images). Multi-task neural network 256 may process input image I(x,y,c) and may generate network output data 264 based on input image I(x,y,c).

When AR device 200 is operating in a runtime mode, network output data 264 may be used in conjunction with calibration angle κ to compute gaze vector 238. In some embodiments, a post-processing block 266 may perform one or more operations to compute gaze vector 238. In other embodiments, or in the same embodiments, calibration angle κ may be provided as input to multi-task neural network 256 along with input image I(x,y,c), and gaze vector 238 may directly be included in network output data 264 or may be computed based on network output data 264.

When AR device 200 is operating in a training mode, network output data 264 may be compared to GT data 268. Error data 270 may be computed based on the comparison and may represent a difference between network output data 264 and GT data 268 such that, in some embodiments, a magnitude of error data 270 may be proportional to the difference between network output data 264 and GT data 268. Multi-task neural network 256 may be modified (e.g., using modifier 272) based on error data 270. In some embodiments, the magnitude of the modification to multi-task neural network 256 may be proportional to the magnitude of error data 270 such that larger differences between network output data 264 and GT data 268 may correspond to larger modifications to multi-task neural network 256.

In some embodiments, some or all of the operations described herein as being associated with training mode may be performed independent from AR device 200. For example, in such embodiments, multi-task neural network 256 may be at least partially trained prior to the manufacture and/or distribution of AR device 200, and subsequently loaded onto AR device 200 at the time of manufacture and/or distribution of AR device 200. In at least some of these embodiments, multi-task neural network 256 may be at least partially trained with data from a relatively large population of subjects and by way of one or more computing devices different from AR device 200. In some such embodiments, AR device 200 may perform one or more of the operations described herein as being associated with training mode so as to further train preloaded multi-task neural network 256 with data from a specific user of AR device 200. This may allow one or more portions of multi-task neural network 256 to become personalized for each user of AR device 200. In some embodiments, AR device 200 may store a personalized version of multi-task neural network 256 for each user of AR device 200. As such, in these embodiments, AR device 200 may store multiple different versions of multi-task neural network 256 for multiple different users, and may use the version of multi-task neural network 256 that is associated with the current user of AR device 200 at runtime.

Figure 6:
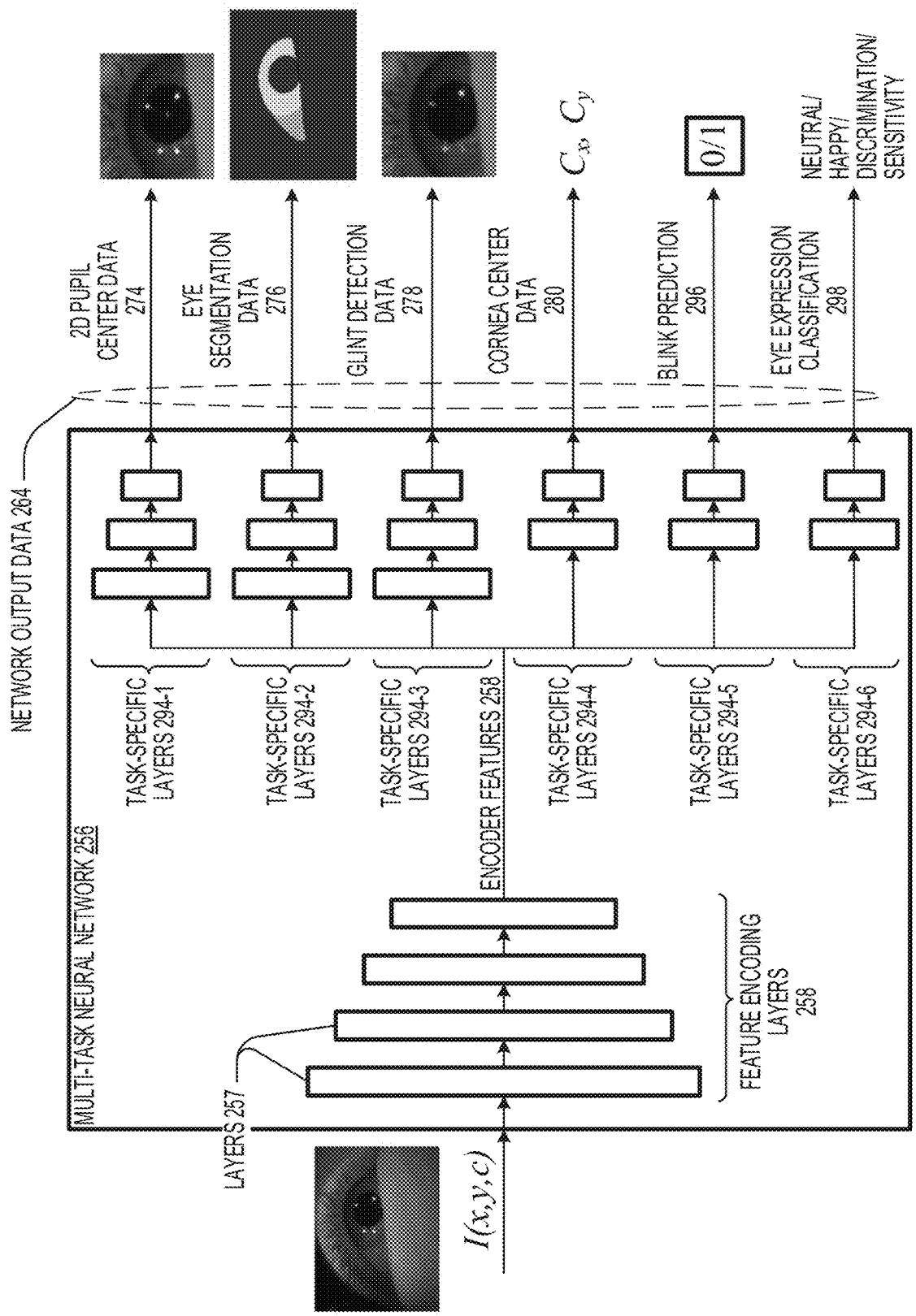
FIG. 6 illustrates a schematic view of a multi-task neural network.

FIG. 6 illustrates a schematic view of multi-task neural network 256, which consists of various layers 257. In some embodiments, multi-task neural network 256 comprises a feature encoding base network made up of feature encoding layers 258 (alternatively referred to as encoder layers) and six task branches made up of task-specific layers 294 (alternatively referred to as decoder layers). The six task branches correspond to (1) pupil center estimation and glint localization which generates 2D pupil center data 274, (2) eye parts semantic segmentation which generates eye segmentation data 276, (3) pupil and glints presence classification which generates glint detection data 278, (4) 2D cornea estimation which generates cornea center data 280, (5) blink detection which generates blink prediction 296, and (6) emotive expression classification which generates eye expression classification 298.

Network output data 264 may include one or more of the types of data shown in FIG. 6. Based on whether AR device 200 is operating in training mode or runtime mode, one or more of the types of data may not be utilized in subsequent processing. Alternatively or additionally, one or more of the types of data may not be generated by multi-task neural network 256 to save processor usage, power, and/or memory. Alternatively or additionally, one or more of the types of data may not be generated based on user input. For example, certain applications operating on AR device 200 may request that only certain types of data be generated, such as eye expression classification 298.

In some embodiments, feature encoding layers 258 can produce encoder features 282 that are shared across each of the task branches. In some implementations, an image feature extraction network and a feature pyramid (FPN) are used to capture information from different scales. In some implementations, features from the top-most layer of the encoder (e.g., having a size 20×15×256) may be used as input to the task branches.

In some embodiments, multi-task neural network 256 includes three major appearance-based tasks in the multi-task learning model, which include (1) eye parts segmentation, (2) pupil and glint localization, and (3) pupil and glint presence classification. In some embodiments, eye parts segmentation is defined as the task of assigning every pixel in input image I(x,y,c) a class label from the following: background, sclera, iris and pupil. For this task, encoder features 282 corresponding to the last layer feature map from the encoder network (e.g., feature encoding layers 258) may be obtained and up-sampled using deconvolutional layers to the same resolution as input image I(x,y,c). The resulting four channel output may be converted to class probabilities using a softmax layer for each pixel independently. The loss may be a cross-entropy loss between the predicted probability distribution and the one-hot labels obtained from manually annotated ground truth (one-hot labels being vectors having all zeros except for one value, e.g., [0, 0, 1, 0, 0]).

In some embodiments, the following loss is minimized for a pixel x, y with GT class c and predicted probability $p_k(x,y)$ for the $k^{th}$ class:

$$\mathcal{L}(x, y) = -\sum_{k=1}^{4} I_{x,y}[k == c]\log p_k(x, y), \quad (1)$$

where $I_{x,y}[.]$ is the indicator function. The overall loss may be the sum of the losses over all pixels in the image. The segmentation task serves as a bootstrap phase for training feature encoder layers 258 as it captures rich semantic information of the eye image. By itself, eye parts segmentation can help the initial phase of any classical pipeline in terms of localizing the search for glints (using iris boundary) and to estimate the pupil center (using pupil boundary). In some implementations, eye parts segmentation can be useful for rendering eyes of digital avatars.

The pupil and glint localization branch provides the pixel locations of the four glints and pupil center, for a total of five keypoints. The network decoder layers for these two tasks, which may be similar to the eye parts segmentation branch, may predict a set of five dense maps at the output corresponding to the five keypoints. Each dense map may be normalized to sum to unity across all the pixels. A cross-entropy loss may then be calculated across all the pixels of each map during training. Once trained, the location of the center of the pupil or a particular glint is the pixel corresponding to maximum probability at the output. In some embodiments, the following loss is minimized for every keypoint (four glints and one pupil center):

$$\mathcal{L}(\text{keypoint}) = -\sum_{x,y} I[x, y]\log p_{x,y}, \quad (2)$$

where I[.] is an indicator function that is zero everywhere except for the GT keypoint location, $p_{x,y}$ is the predicted probability of the keypoint location, and the summation is over all the pixels in the image.

In realistic settings, glints and/or the pupil center can be occluded by the closing of eyelids, nuisance reflections can appear as glints, and/or for some gaze angles glints may not appear on the reflective corneal surface. Therefore it may be important to learn to classify robustly the presence or absence of glints and the pupil center. These predictions can effectively gate whether a glint should be used for cornea center estimation and similarly for 3D pupil center estimation.

For this task, encoder features 282 corresponding to the top-most layer feature map from the encoder network (e.g., feature encoding layers 258) may be obtained, one convolution layer may be used to reduce the number of feature channels, the reduced number of feature channels may be reshaped to a one dimensional array, and one trainable fully-connected layer (e.g., of size 1500×10) may be added to produce an output (e.g., a 5×2 sized output). Each pair may represent the presence or absence probability for one of the four glints and/or the pupil center. A binary cross-entropy loss may be used to learn from human labeled ground truth.

With respect to cornea center estimation, the center of the cornea is a geometric quantity in 3D which cannot be observed in a 2D image of an eye. Hence, unlike pupil (center of pupil ellipse) or glint labeling, it may not be possible to directly hand label the projected location of the 3D cornea center on the image. Therefore, a two-step method may be employed to train the cornea 2D center prediction branch for multi-task neural network 256. First, well known geometric constraints and relevant known/estimated quantities (LED, glints) may be used to generate cornea 2D supervision. Then, the 2D cornea branch may be trained using this model-based supervision obtained for each frame.

Predicting the cornea using multi-task neural network 256 has two main benefits over using geometric constraints during evaluation. First, such predictions are more robust because deep networks have a tendency to average out noise during training and standard out-of-network optimization can occasionally yield no convergence. Second, such predictions may only incur a small and constant time feed forward compute since the cornea task branch consists of only a few fully connected layers.

The facial expression classification task involves classifying the user's emotive expressions from the input eye images. The task is particularly challenging because only the user's eye regions are available as input rather than the eye brows and/or the entire face, as used in most emotive facial expressions classification benchmarks. In some embodiments, the following individual emotive facial expressions are considered: happiness, anger, disgust, fear, and surprise. These expressions can be grouped into 4 discrete states: positive dimension (happiness), discrimination dimension (anger and disgust), sensitivity dimension (fear and surprise), and a neutral dimension. Like the other task branches, feature encoding layers 258 were fixed and only the facial expressions task branch (consisting of several FC layers) were trained for expression classification. In some embodiments, this task branch is trained for each subject to produce a personalized model, which produces better accuracy than a general model for a large population of subjects.

In some embodiments, network output data 264 may include 2D pupil center data 274. In some embodiments, 2D pupil center data 274 may include a 2D pupil center expressed as a 2D value. For example, the 2D pupil center may include X and Y values within the frame of input image I(x,y,c) corresponding to the computed location of the center of the pupil (e.g., pupil center 308). Alternatively or additionally, 2D pupil center data 274 may include a matrix having dimensions of H×W comprising binary values of 0 or 1 (values of 1 corresponding to the computed location of the center of the pupil).

In some embodiments, network output data 264 may include eye segmentation data 276. Eye segmentation data 276 may include a segmentation of the eye into a plurality of regions. In one particular implementation, the regions may include a background region, a sclera region, a pupil region, and an iris region. In another particular implementation, the regions may include a pupil region and a non-pupil region. In another particular implementation, the regions may include a pupil region, an eye region (including portions of the eye not part of the pupil region), and a background region.

In some embodiments, eye segmentation data 276 may include a matrix having dimensions of H×W comprising a finite set of values, such as 0, 1, 2, and 3 (corresponding to, e.g., a background region, a sclera region, a pupil region, and an iris region, respectively). In some embodiments, eye segmentation data 276 includes an assignment of every pixel of input image I(x,y,c) to a set of classes including background, sclera, pupil, and iris, which may, in some embodiments, be obtained by taking the last layer of (decoder) multi-task neural network 256 and upsampling it to the same resolution as input image I(x,y,c) using deconvolution, which is in turn fed into a softmax cross-entropy loss across feature channels where each feature channel represents the probability of pixels belonging to a certain class.

In some embodiments, network output data 264 may include glint detection data 278. In some embodiments, glint detection data 278 includes one or more glint locations expressed as 2D or 3D values. For example, if only a single glint location is detected, glint detection data 278 may include a single 2D value, or if four glint locations are detected, glint detection data 278 may include four 2D values. In some embodiments, glint detection data 278 may include X and Y values within the frame of input image I(x,y,c) corresponding to the computed locations of the detected glints. Alternatively or additionally, glint detection data 278 may include a matrix having dimensions of H×W comprising binary values of 0 or 1 (values of 1 corresponding to a location of a detected glint).

In some embodiments, network output data 264 may include cornea center data 280. In some embodiments, cornea center data 280 may include a 2D cornea center expressed as a 2D value or a 3D cornea center expressed as a 3D value. For example, the 2D cornea center may include X and Y values within the frame of input image I(x,y,c) corresponding to the computed location of the center of the cornea (e.g., cornea center 306). Alternatively or additionally, cornea center data 280 may include a matrix having dimensions of H×W comprising binary values of 0 or 1 (values of 1 corresponding to the computed location of the center of the cornea).

In some embodiments, network output data 264 may include blink prediction 296. In some embodiments, blink prediction 296 comprises a binary value of 0 or 1 (e.g., corresponding to predictions of open eye and blink, respectively). In some embodiments, blink prediction 296 comprises a probability associated with whether a blink occurred. Detecting blinks is an appearance-based task that is useful to drive multi-focal displays and/or digital avatars. Blinks can be captured across a sequence of images so that temporal information can be used to distinguish blinks from events such as saccades (rapid sideways movement of the eyes).

In general, it can be difficult to accurately locate a blink event in which the eyes are fully closed, particularly at the standard frame rate of 30 frames per second. In other cases, it may be important to detect the onset of blinks to reduce latency between detection and application. In some embodiments, a simple definition of blinks can be the state of the eye when the upper eyelid covers over 50% of the entire pupil region. This can be a useful working definition for non-expert human labelers. Given the aforementioned definition of blinks, encoder features 282 generated by feature encoding layers 258 that were trained for tasks such as eye segmentation transfer well to the blink detection task. In some embodiments, the top-most layer (shared representation) of the pre-trained feature encoding network (e.g., feature encoding layers 258) is used to train the blink detection branch.

Figure 7:
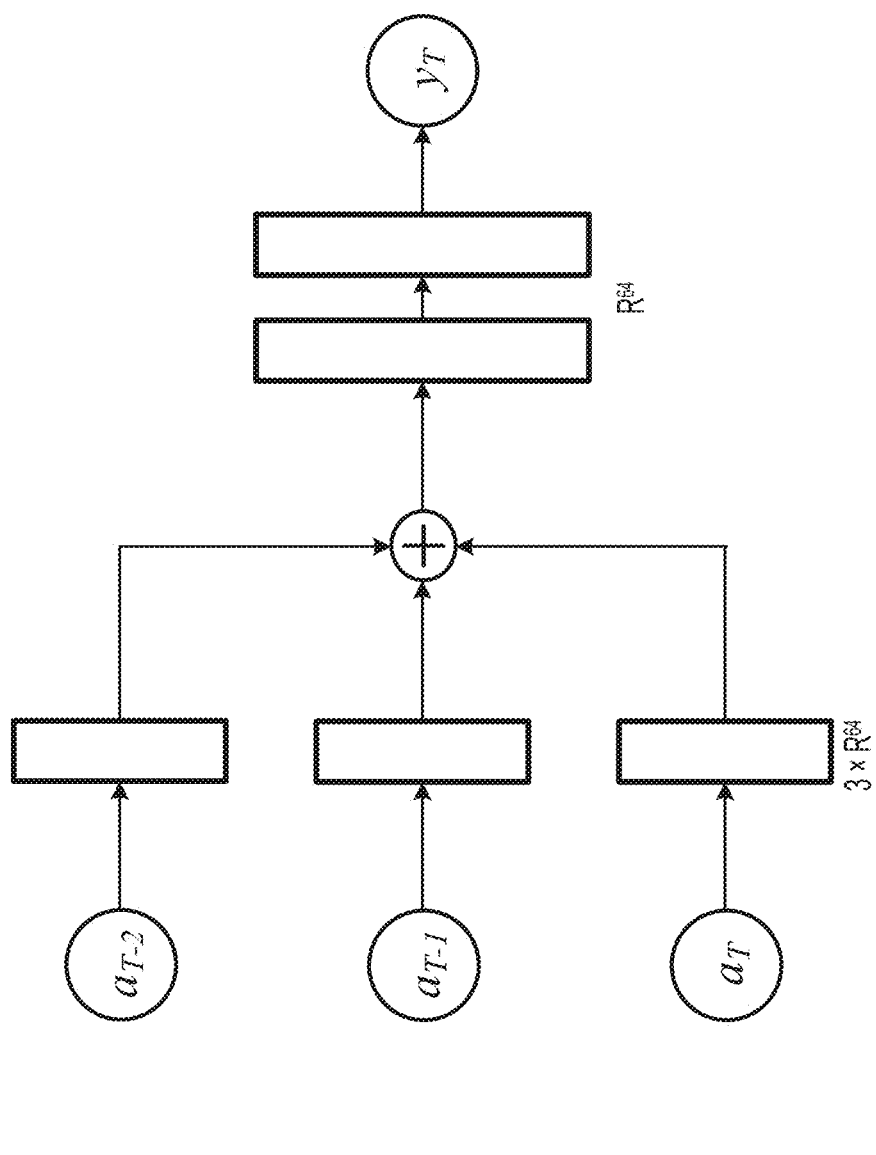
FIG. 7 illustrates a system and technique for generating a blink prediction using features from separate time steps.

FIG. 7 illustrates a system and technique for generating blink prediction 296 using features from separate time steps. In the illustrated embodiment, the encoder features from three continuous time steps at T−2, T−1, and T are fed as inputs $a_{T-2}$, $a_{T-1}$, and $a_T$ into a three layer fully connected network that classifies the current frame (at time T) as being a blink or an open eye and produces an output $y_T$ indicative of the same. While longer temporal window lengths can be employed, they result in diminishing returns in prediction accuracy. Recurrent neural networks (RNNs) and long short-term memories (LSTMs) have similar train and test performances, however network 700 provides lower compute requirements.

Figure 8:
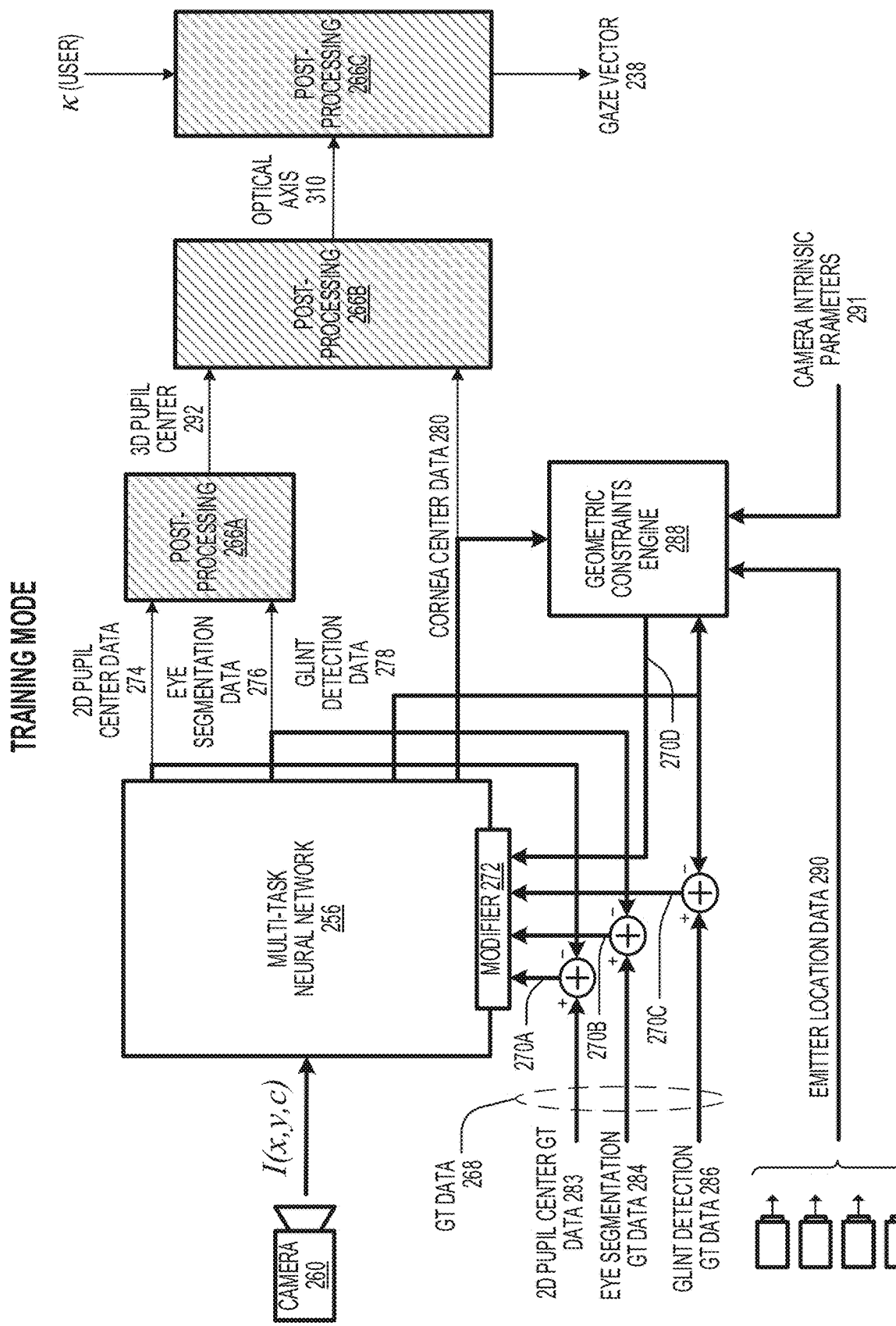
FIG. 8 illustrates a schematic view of an AR device operating in a training mode.

FIG. 8 illustrates a schematic view of AR device 200 operating in a training mode. When AR device 200 is operating in training mode, network output data 264 includes eye segmentation data 276, glint detection data 278, and cornea center data 280. The particular input image I(x,y,c) used to generate these network outputs may also manually examined by one or more individuals who may prepare GT data 268 prior to, subsequent to, or concurrently with generation of network output data 264 by multi-task neural network 256. For example, an individual may examine a displayed version of input image I(x,y,c) on an electronic device such as a personal computer or a smart phone. A program or application on the electronic device may ask the individual a set of questions related to input image I(x,y,c) and the individual may input his/her responses using an input device such as a mouse, keyboard, touchscreen, etc.

While observing and examining input image I(x,y,c), the individual may prepare 2D pupil center GT data 283 by identifying, using an input device, the contours of the pupil. This may include the individual placing an ellipse boundary over the pupil and causing the pupil center to be automatically calculated based on the placed ellipse boundary. 2D pupil center GT data 283 may be prepared so as to have the same formatting and dimensions as 2D pupil center data 274 (e.g., an X and Y value). Additionally, while observing and examining input image I(x,y,c), the individual may prepare eye segmentation GT data 284 by deciding that a first region of the image should be assigned as the background region, a second region as the sclera region, a third region as the pupil region, and a fourth region as the iris region. Eye segmentation GT data 284 may be prepared so as to have the same formatting and dimensions as eye segmentation data 276 (e.g., a matrix having dimensions of H×W comprising a finite set of values, such as 0, 1, 2, and 3 corresponding to the different regions).

Additionally, while observing and examining input image I(x,y,c), the individual may prepare glint detection GT data 286 by deciding how many glint locations are present in input image I(x,y,c) and the locations of each. Glint detection GT data 286 may be prepared so as to have the same formatting and dimensions as glint detection data 278 (e.g., a set of 2D values), or if some number of glint locations are detected (e.g., four), glint detection GT data 286 may include that number of 2D values. In some embodiments, glint detection GT data 286 may include X and Y values within the frame of input image I(x,y,c) corresponding to the computed locations of the detected glints. Alternatively or additionally, glint detection GT data 286 may include a matrix having dimensions of H×W comprising binary values of 0 or 1 (values of 1 corresponding to a location of a detected glint).

In one particular implementation, GT data 268 may be obtained by having an individual or a group of individuals face a 3×3 grid of points at two distinct depths, a near depth at, e.g., 3 meters and a farther plane at, e.g., 6 meters. On a given cue, an individual is asked to focus their gaze on one of these 18 3D points, which allow GT data 268 for gaze vector 238 to be collected for each frame (to later determine overall accuracy). Images captured of the individual's eye (using a camera of an AR device worn by the individual) may be analyzed to allow GT data 268 to include eye segmentation and glint location information. Because there is diminishing returns in annotating segmentation, glints, and pupil centers for every frame at 30 or 60 Hz recordings, some number (e.g., 200) of left or right eye image frames may be uniformly sampled for each individual to manually annotate segmentation, glint presence or absence, glint 2D and pupil 2D positions. In one particular experimental run, 87,000 annotated images were used in a dataset to train and validate performance of multi-task neural network 256.

In some embodiments, error data 270 may include a first error data 270A computed based on the difference between 2D pupil center data 274 and 2D pupil center GT data, a second error data 270B computed based on the difference between eye segmentation data 276 and eye segmentation GT data 284, a third error data 270C based on the difference between glint detection data 278 and glint detection GT data 286, and a fourth error data 270C generated by a geometric constraints engine 288. Inputs to geometric constraints engine 288 include one or more of cornea center data 280, glint detection data 278, emitter location data 290, and camera intrinsic parameters 291. Emitter location data 290 may include the fixed locations of emitters 262 and/or the emitting directions of emitters 262. Emitter location data 290 may be determined upon manufacture of AR device 200 and/or during a calibration phase. Camera intrinsic parameters 291 may include the optical center and/or the focal length of off-axis camera 260, among other possibilities. Camera intrinsic parameters 291 may be determined upon manufacture of off-axis camera 260 and/or during a calibration phase.

Geometric constraints engine 288 may perform various operations to evaluate the consistency between different generated data (glint detection data 278 and cornea center data 280) and calibrated data (emitter location data 290), and the output of geometric constraints engine 288, fourth error data 270D, may be inversely related to a likelihood or consistency parameter. In some instances, corneal sphere 304 is reconstructed using glint detection data 278 and emitter location data 290, and fourth error data 270D is set to a calculated distance between the center of the reconstructed sphere and the cornea center as indicated by cornea center data 280.

In some embodiments, the training of multi-task neural network 256 is improved by training sequentially using only certain outputs of multi-task neural network 256 during different training iterations. In a first training step, only eye segmentation data 276 is used to train multi-task neural network 256. This may be accomplished by modifying multi-task neural network 256 only using second error data 270B. Once multi-task neural network 256 is sufficiently trained (i.e., sufficiently accurate) for eye segmentation, a second training step is performed by additionally using glint detection data 278 to train multi-task neural network 256. This may be accomplished by modifying multi-task neural network 256 only using third error data 270C. Once multi-task neural network 256 is sufficiently trained for eye segmentation and glint detection, a third training step is performed by additionally using cornea center data 280 to train multi-task neural network 256. This may be accomplished by modifying multi-task neural network 256 using all of error data 270. In some instances, the same training images and GT data may be used during different training steps. In some embodiments, AR device 200 remains in training mode until an accuracy threshold is met or a maximum iteration threshold is met (e.g., the number of training images used meets an iteration threshold).

Figure 9A:
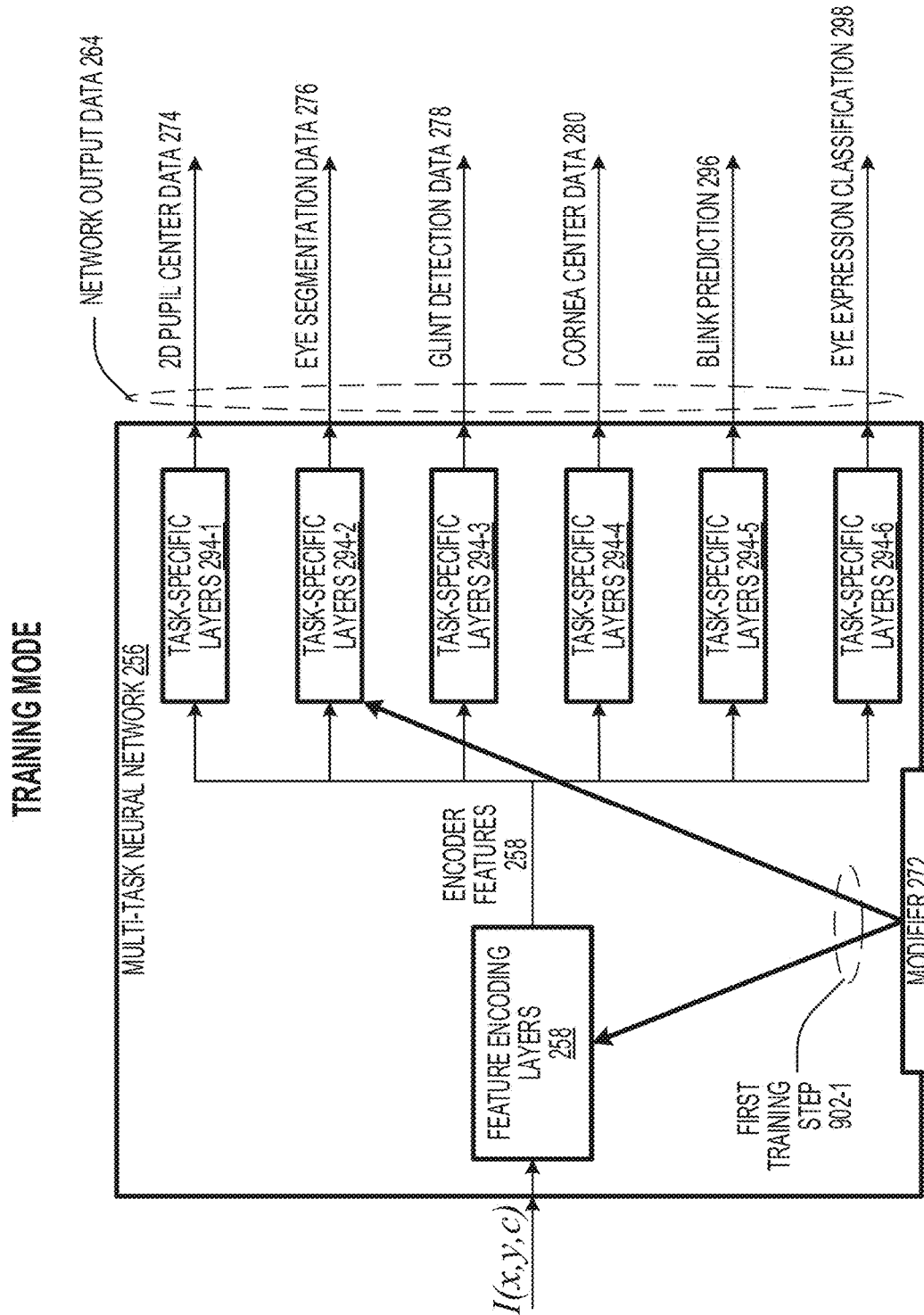
FIGS. 9A and 9B illustrate schematic views of sequential training steps for training a multi-task neural network.
Figure 9B:
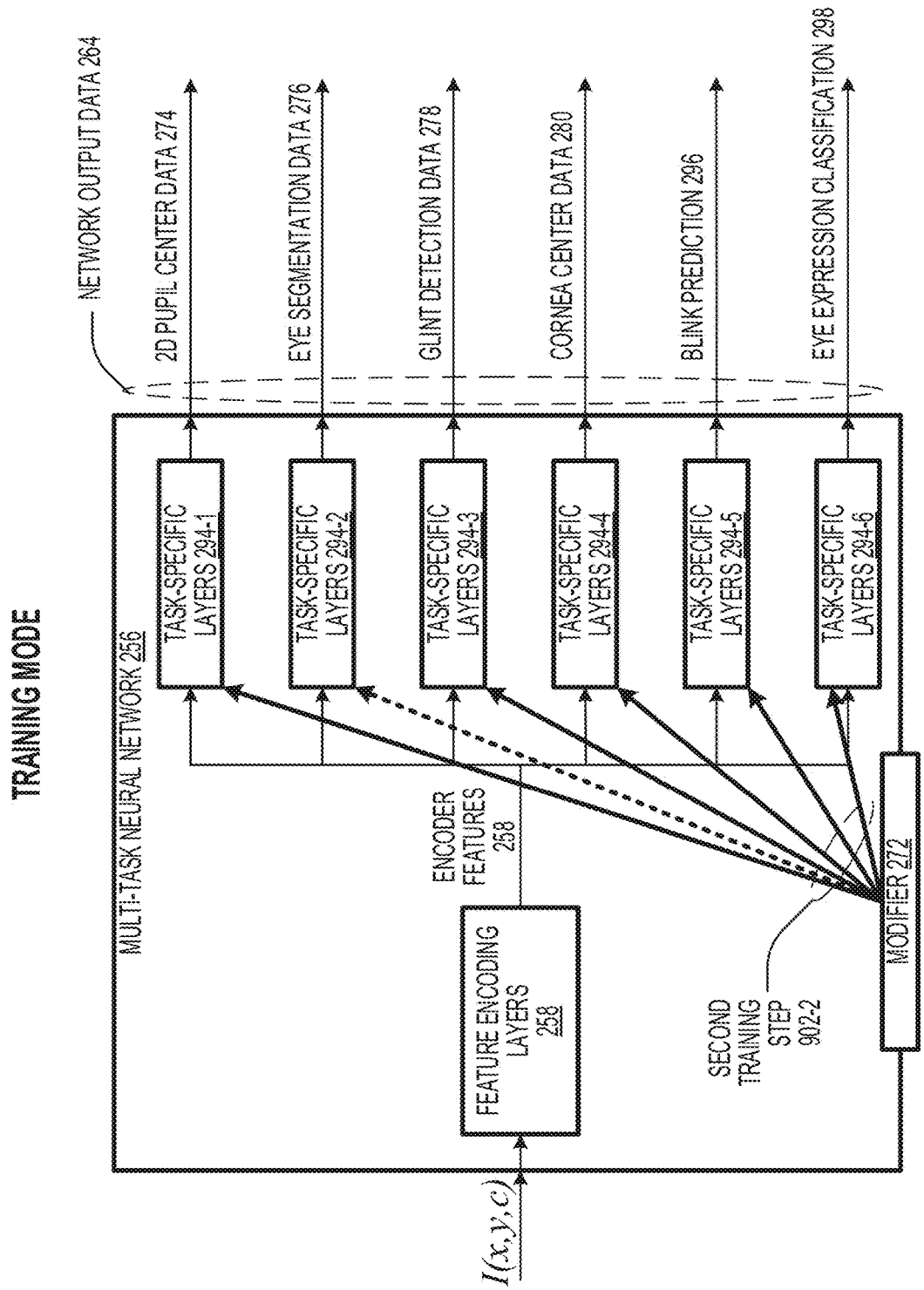

FIGS. 9A and 9B illustrate schematic views of sequential training steps 902 for training multi-task neural network 256. In reference to FIG. 9A, a first training step 902-1 is illustrated. During first training step 902-1, feature encoding layers 258 and task-specific layers 294-2 (corresponding to the decoder layers for generating eye segmentation data 276) are trained independent of the remaining task-specific layers 294. For example, during a training iteration, input image I(x,y,c) may be provided to multi-task neural network 256 and may also be presented to an individual who may prepare eye segmentation GT data 284. Using second error data 270B computed based on the difference between eye segmentation data 276 and eye segmentation GT data 284, modifier 272 may modify weights associated with feature encoding layers 258 and task-specific layers 294-2 (e.g., using backpropagation) such that second error data 270B would be decreased during a subsequent computation of second error data 270B based on the difference between eye segmentation data 276 and eye segmentation GT data 284. During first training step 902-1, modifier 272 does not modify the weights associated with task-specific layers 294-1, 294-3, 294-4, 294-5, or 294-6.

In reference to FIG. 9B, a second training step 902-2 is illustrated. In some embodiments, second training step 902-2 is performed after first training step 901-1. During second training step 902-2, one or more of task-specific layers 294-1, 294-3, 294-4, 294-5, and 294-6 are trained independent of feature encoding layers 258 and task-specific layers 294-2. For example, during a first training iteration, input image I(x,y,c) may be provided to multi-task neural network 256 and may also be presented to an individual who may prepare relevant GT data 268. Using error data 270 computed based on the difference between network output data 264 and GT data 268, modifier 272 may modify weights associated with task-specific layers 294-1, 294-3, 294-4, 294-5, and/or 294-6 (e.g., using backpropagation) such that error data 270 would be decreased during a subsequent computation of error data 270. During second training step 902-2, modifier 272 does not modify the weights associated with feature encoding layers 258 or task-specific layers 294-2, although in some embodiments task specific layer 294-2 may be fine-tuned during second training step 902-2, as indicated by the dashed line.

In some embodiments, task-specific layers 294-1, task-specific layers 294-2, and task-specific layers 294-3 may each include one or more convolutional layers and one or more deconvolutional layers. In some embodiments, task-specific layers 294-4 and task-specific layers 294-6 may be architecturally similar or identical to one another, but may be trained as two separate branches. In at least some of these embodiments task-specific layers 294-4 and task-specific layers 294-6 may each include one or more convolutional layers. Furthermore, in some embodiments, task-specific layers 294-5 may be architecturally similar or identical to that of neural network 700, as described above in reference to FIG. 7.

As illustrated in FIG. 6, some outputs of multi-task neural network 256 may be obtained with fewer performed operations than other outputs of multi-task neural network 256. For example, cornea center data 280 may be obtained with fewer computations than other outputs, and eye segmentation data 276 may be obtained with more computations than other outputs. Accordingly, one advantage of training multi-task neural network 256 using eye segmentation data 276 first is that some layers that are only used for computation of eye segmentation data 276 can be fine-tuned without being affected by feedback from the other outputs.

Figure 10:
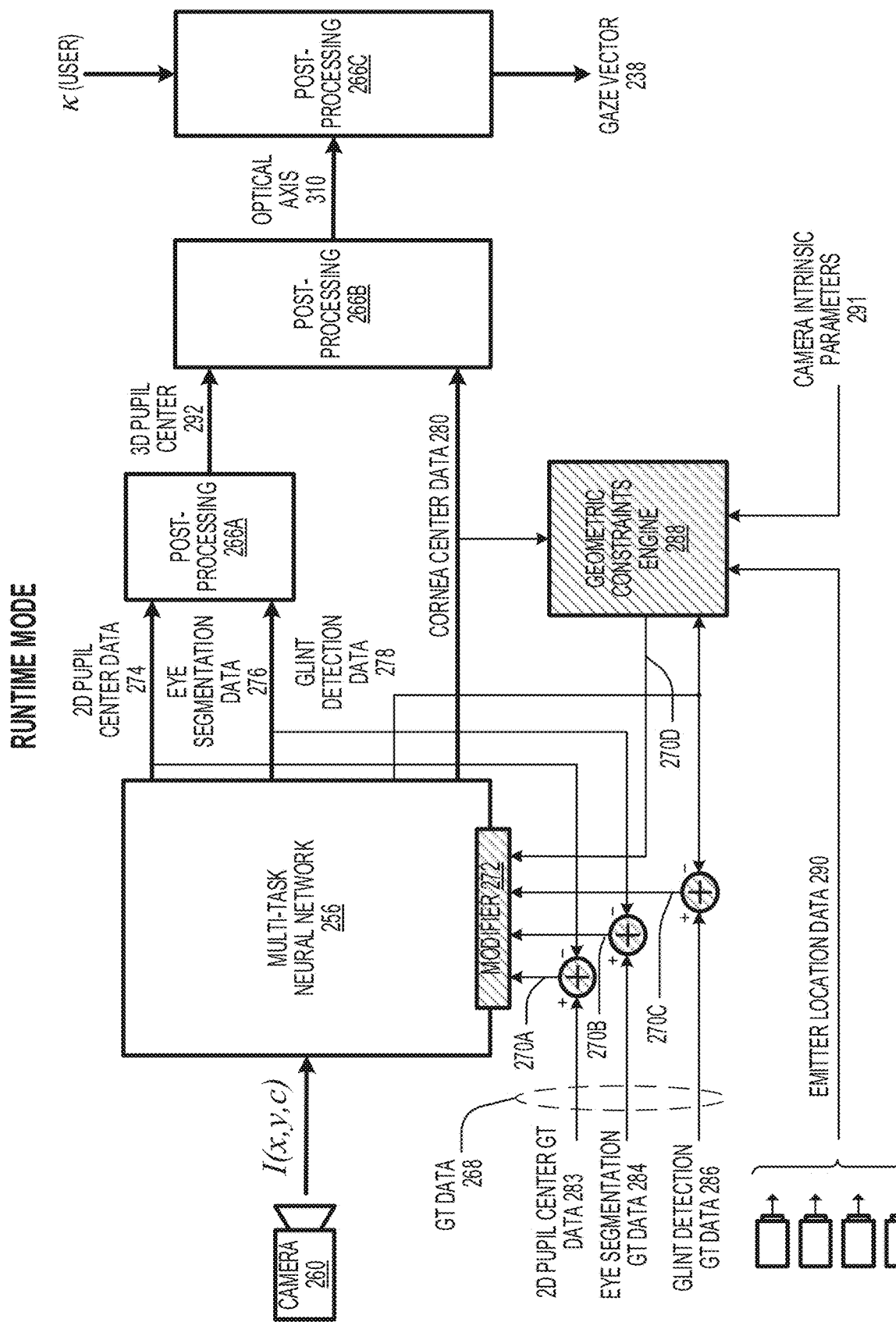
FIG. 10 illustrates a schematic view of an AR device operating in a runtime mode.

FIG. 10 illustrates a schematic view of AR device 200 operating in a runtime mode. When AR device 200 is operating in runtime mode, network output data 264 may include eye segmentation data 276, glint detection data 278, and cornea center data 280. These outputs may be used in conjunction with calibration angle κ to compute gaze vector 238 using post-processing block 266. In some embodiments, post-processing block 266 may be separated into a first post-processing block 266A, a second post-processing block 266B, and a third post-processing block 266C. First post-processing block 266A receives 2D pupil center data 274 and eye segmentation data 276 as inputs and computes 3D pupil center 292. Second post-processing block 266B receives 3D pupil center 292 and cornea center data 280 as inputs and computes optical axis 310. Third post-processing block 266C receives optical axis 310 and calibration angle K as inputs and computes gaze vector 238.

The accuracy of multi-task neural network 256 has been demonstrated, for example, as described in U.S. Provisional Application No. 62/935,584. One example of the accuracy of the eye segmentation is shown in the table below, which provides an eye segmentation confusion matrix percentage values, with the averaged accuracy for all four classes being over 97.29%.

| GT/Pred | Pupil | Iris | Sclera | BG |
| --- | --- | --- | --- | --- |
| Pupil | 96.25 | 3.75 | 0.00 | 0.00 |
| Iris | 0.04 | 99.03 | 0.93 | 0.00 |
| Sclera | 0.00 | 3.27 | 96.71 | 0.02 |
| BG | 0.01 | 0.72 | 2.09 | 97.18 |

These results are very accurate in terms of both quantitative and qualitative evaluations. This can be important since the segmentation boundaries may be used to generate precise pupil 2D center location training data, particularly for the partially occluded pupil cases, by carefully tuned ellipse fitting procedures. The segmentation predictions can also be used by a classical geometric pipeline which can be used as a baseline for gaze estimation comparisons.

As another example, the accuracy of the pupil and glint detection is shown in the table below, which shows quantitative results for predicting pixel locations using each of multi-task neural network 256 ("NN 256") and a classical pipeline.

|  | Classical Localization in Pixels | NN 256 Localization in Pixels | Classical Presence/ Absense | NN 256 Presence/ Absense |
| --- | --- | --- | --- | --- |
| Pupil | 0.64 | 0.46 | 92.81% | 99.61% |
| Glint 1 | 1.21 | 0.47 | 90.16% | 96.94% |
| Glint 2 | 1.08 | 0.39 | 90.84% | 96.32% |
| Glint 3 | 0.84 | 0.23 | 92.14% | 96.85% |
| Glint 4 | 0.78 | 0.37 | 91.56% | 96.34% |
| Avg | 0.86 | 0.38 | 91.72% | 98.06% |

When the images are from ideal settings, multi-task neural network 256 and classical predictions are all precise with close-to zero errors. However, when the images have severe reflections or the users gaze is away from the central targets, multi-task neural network 256 is able to first detect the presence or absence of the glints very accurately, and provide robust labeling of the glints, whereas the classical approach suffers from inferior absence indication and mislabeling of the glints, resulting in a much higher error under our a Euclidean error metric.

Figure 11:
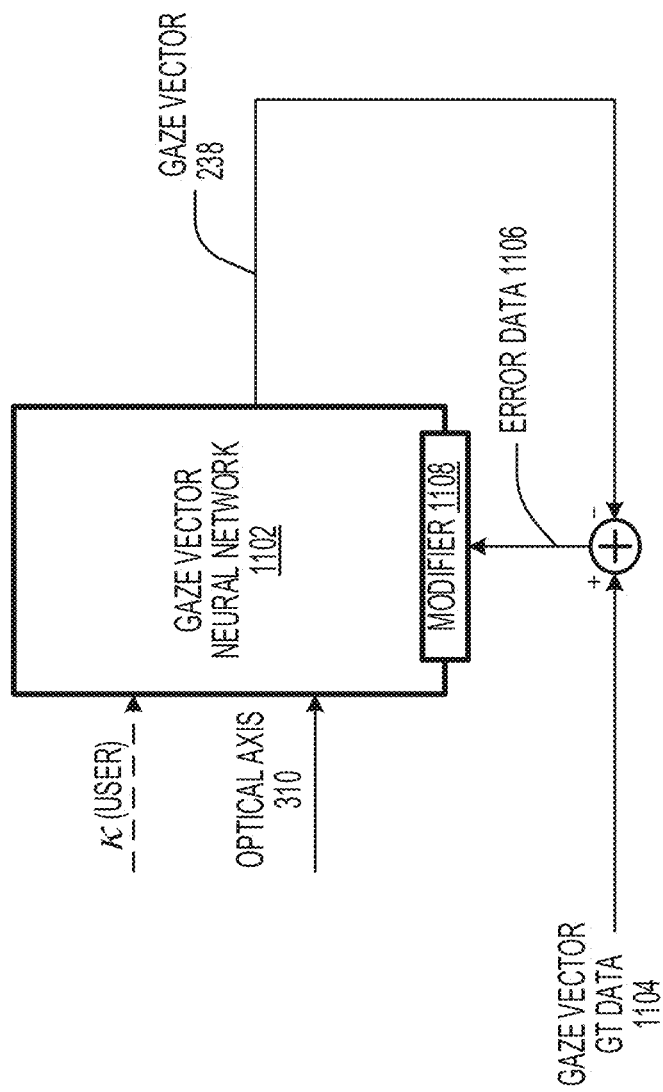
FIG. 11 illustrates a schematic view of a gaze vector neural network.

FIG. 11 illustrates a schematic view of a gaze vector neural network 1102, which may generate a gaze vector 238 based on calibration angle κ and optical axis 310. In some embodiments, gaze vector neural network 1102 may replace or be incorporated into post-processing block 266C. In one implementation, gaze vector neural network 1102 includes 5 layers and approximately 30,000 parameters or weights. In some embodiments, gaze vector neural network 1102 is only trained on calibration frames.

During training, gaze vector 238 may be compared to gaze vector GT data 1104. Error data 1106 may be computed based on the comparison and may represent a difference between gaze vector 238 and gaze vector GT data 1104 such that, in some embodiments, a magnitude of error data 1106 may be proportional to the difference between gaze vector 238 and gaze vector GT data 1104. Gaze vector neural network 1102 may be modified (e.g., using modifier 1108) based on error data 1106. In some embodiments, the magnitude of the modification to gaze vector neural network 1102 may be proportional to the magnitude of error data 1106 such that larger differences between gaze vector 238 and gaze vector GT data 1104 may correspond to larger modifications to gaze vector neural network 1102.

In some embodiments, gaze vector GT data 1104 may be obtained by a user looking at targets generated on a screen. For example, a user may wear AR device 200, which may include previously-trained multi-task neural network 256. During a training iteration, the user may be instructed to look at a target located on a display while wearing AR device 200. Input image I(x,y,c) may be captured of the eye of the user and be used to generate optical axis 310. Based on optical axis 310 (and optionally based on calibration angle κ), gaze vector 238 may be generated by gaze vector neural network 1102. Gaze vector GT data 1104 may be determined based on the relationship between the wearable device and the target generated on the display. For example, an orientation between AR device 200 and the display may be determined based on one or more sensors, such as cameras and/or inertial measurement units, and the determined orientation may be used to calculate the actual gaze vector of the user's eye.

During a subsequent training iteration, the target may be moved to a new location on the display, a new input image I(x,y,c) may be captured of the eye of the user, and gaze vector neural network 1102 may be modified using a newly calculated error data 1106. During various training iterations, the target may be moved to various locations across the screen so as to train gaze vector neural network 1102 to robustly estimate the gaze vector over a wide range of gaze angles. In some embodiments, various lighting conditions and/or user emotions may be employed during the training process in combination with various gaze vectors, resulting in a robustly trained network.

An example of the accuracy of the gaze estimation can be demonstrated by the table below, which shows gaze error for each of 9 targets aggregated over different target planes, with an overall gaze estimation metric being defined as the angular error between the true gaze vector and the estimated gaze vector (e.g., in arcmin units).

|  | NN 256 + NN 1102 Mean | Classical Mean | NN 256 + NN 1102 Standard Deviation | Classical Standard Deviation |
|---|---|---|---|---|
| Top Left | 194.18 | 261.05 | 105.63 | 304.42 |
| Top Middle | 169.64 | 148.28 | 103.53 | 143.25 |
| Top Right | 184.95 | 162.57 | 109.16 | 154.25 |
| Center Left | 195.15 | 298.44 | 105.78 | 331.17 |
| Center Middle | 183.57 | 147.15 | 106.18 | 143.11 |
| Center Right | 193.35 | 161.74 | 108.62 | 151.77 |
| Bottom Left | 205.55 | 300.94 | 105.56 | 323.00 |
| Bottom Middle | 179.15 | 154.19 | 100.55 | 146.39 |
| Bottom Right | 181.35 | 166.15 | 103.47 | 161.19 |

It is clear that estimates using multi-task neural network 256 and gaze vector neural network 1102 are significantly better and similar in all directions. This can primarily be attributed to robust glint and cornea 2D estimates along with the use of the gaze vector neural network 1102.

Figure 12:
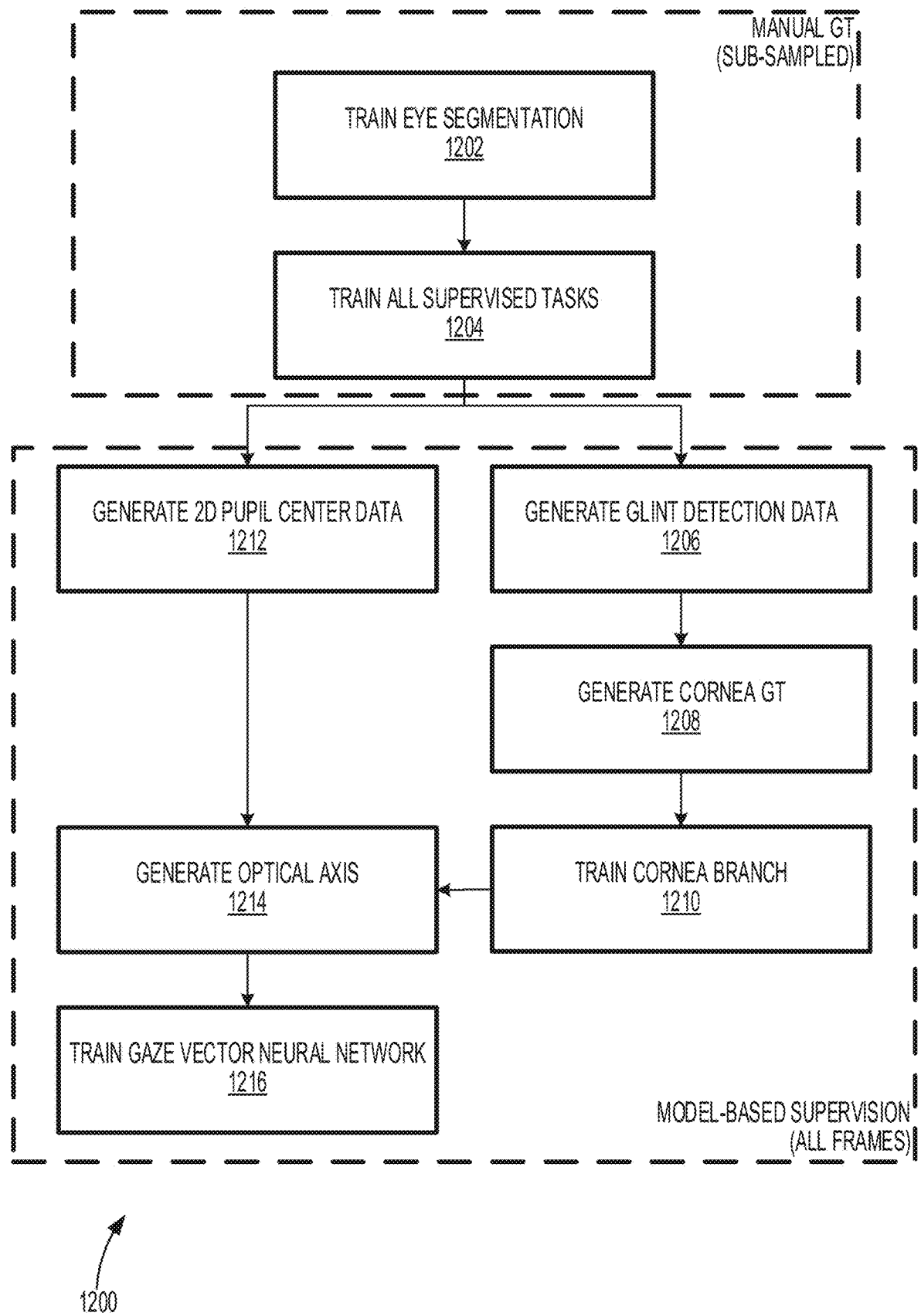
FIG. 12 illustrates a training pipeline.

FIG. 12 illustrates a training pipeline 1200, according to some embodiments of the present invention. In some instances, the complete training can take several steps because the framework receives GT from different sources and because the model-based supervision uses estimates from the trained network itself. For example, the model first trains eye segmentation and glint prediction and then uses the trained model to predict the glints on all unlabeled data. Next, using these predicted glints and known locations of the LEDs, the cornea position is inferred based on a standard eye model and geometry. Since the supervision to train the model to predict cornea prediction comes from using a previously trained model and a standard eye model and geometry, the technique may be referred to as model-based supervision.

At step 1202, the encoder-decoder network is first trained with eye segmentation labels (e.g., eye segmentation GT data 284) because it provides the richest semantic information and is the most complicated supervised task to train accurately.

At step 1204, all of the supervised tasks are trained. Further at step 1204, human labeled glint data (e.g., glint detection GT data 286), pupil 2D center data (2D pupil center GT data 283), and eye segmentation data (e.g., eye segmentation GT data 284) may be used together to jointly train each of these three supervised tasks. In some instances, initializing with weights trained from eye segmentation can result in a more stable training than from random initialization.

At step 1206, glint predictions (e.g., glint detection data 278) are made for all frames and are used along with known locations of the LEDs (e.g., emitter location data 290) to generate cornea 2D GT at step 1208 (generated within geometric constraints engine 288) for training the cornea branch at step 1210 (e.g., using fourth error data 270D). It should be noted that the cornea branch is trained with data from the whole training set population, and is further personalized (fine-tuned) at the per subject calibration phase.

After 3D pupil centers are predicted at step 1212, the predicted cornea (personalized) and pupil 3D centers from the calibration frames are used to deduce the optical axis at step 1214. Using the gaze targets GT, gaze vector neural network 1102 is trained at step 1216 to transform the optical axis to the visual axis. During runtime, the predicted cornea and pupil 2D centers are obtained from multi-task neural network 256. These quantities are used to lift to 3D to obtain the optical axis, which is then fed into the gaze mapping network to infer the predicted gaze direction.

The blink and facial expression classification tasks are trained on top of intermediate features of the main feature encoding branch. Blink detection is a temporal task, which entails capturing three consecutive eye images and extracting their intermediate features. With a set of pre-computed features, the blink detection branch is trained separately while the main feature encoding branch of multi-task neural network 256 remains frozen. A similar procedure is followed at runtime. For facial expression classification, the main feature encoding branch is frozen and only the expression classification layers are trained using expression data. The expression predictions are produced along with all other tasks during runtime.

Figure 13:
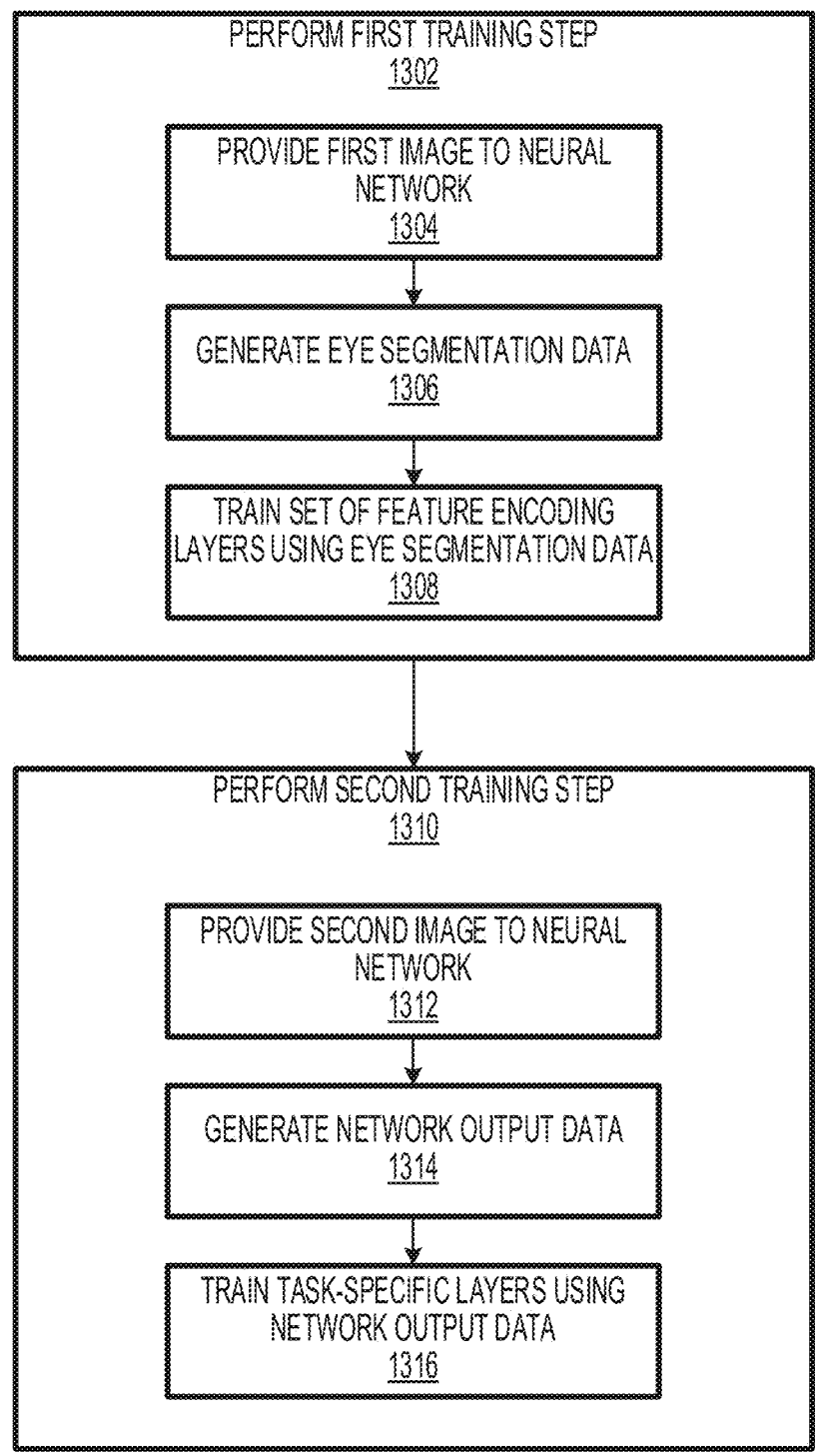
FIG. 13 illustrates a method of training a neural network having a set of feature encoding layers and a plurality of sets of task-specific layers.

FIG. 13 illustrates a method 1300 of training a neural network (e.g., multi-task neural network 256) having a set of feature encoding layers (e.g., feature encoding layers 258) and a plurality of sets of task-specific layers (e.g., task specific layers 294) that each operate on an output (e.g., encoder features 282) of the set of feature encoding layers. Steps of method 1300 need not be performed in the order shown, and one or more steps of method 1300 may be omitted during performance of method 1300. In some embodiments, one or more steps of method 1300 may be performed by processing module 250 or some other component of AR device 200.

At step 1302, a first training step (e.g., first training step 902-1) is performed. In some embodiments, the first training step is performed during a first time duration. In some embodiments, step 1302 includes steps 1304, 1306, and/or 1308.

At step 1304, a first image (e.g., input image I(x,y,c)) of a first eye is provided to the neural network. In some embodiments, the first image is captured by and/or received from a camera (e.g., off-axis camera 260). In some embodiments, method 1300 includes the step of capturing, using the camera, the first image of the first eye. In some embodiments, method 1300 includes the step of sending the first image of the first eye from the camera to a processing module (e.g., processing module 250).

At step 1306, eye segmentation data (e.g., eye segmentation data 276) is generated using the neural network based on the first image. In some embodiments, the eye segmentation data includes a segmentation of the first eye into a plurality of regions.

At step 1308, the set of feature encoding layers are trained using the eye segmentation data. In some embodiments, a single set of task-specific layers of the plurality of sets of task-specific layers is also trained using the eye segmentation data during the first training step. In some embodiments, error data (e.g., error data 270B) is computed based on a difference between the eye segmentation data and eye segmentation GT data (e.g., eye segmentation GT data 284). In some embodiments, the error data is used to train the set of feature encoding layers.

At step 1310, a second training step (e.g., second training step 902-2) is performed. In some embodiments, the second training step is performed during a second time duration. In some embodiments, the second time duration is after the first time duration. In some embodiments, step 1310 includes steps 1312, 1314, and/or 1316.

At step 1312, a second image (e.g., input image I(x,y,c)) of a second eye is provided to the neural network. The second eye may be the same as or different than the first eye. In some embodiments, the second image is captured by and/or received from the camera. In some embodiments, method 1300 includes the step of capturing, using the camera, the second image of the second eye. In some embodiments, method 1300 includes the step of sending the second image of the second eye from the camera to the processing module.

At step 1314, network output data (e.g., network output data 264) is generated using the set of feature encoding layers and each of the plurality of sets of task-specific layers based on the second image.

At step 1316, the plurality of sets of task-specific layers are trained using the network output data. In some embodiments, the set of feature encoding layers are not trained during the second training step. In some embodiments, error data (e.g., error data 270) is computed based on a difference between the network output data and GT data (e.g., GT data 268). In some embodiments, the error data is used to train the plurality of sets of task-specific layers.

Figure 14:
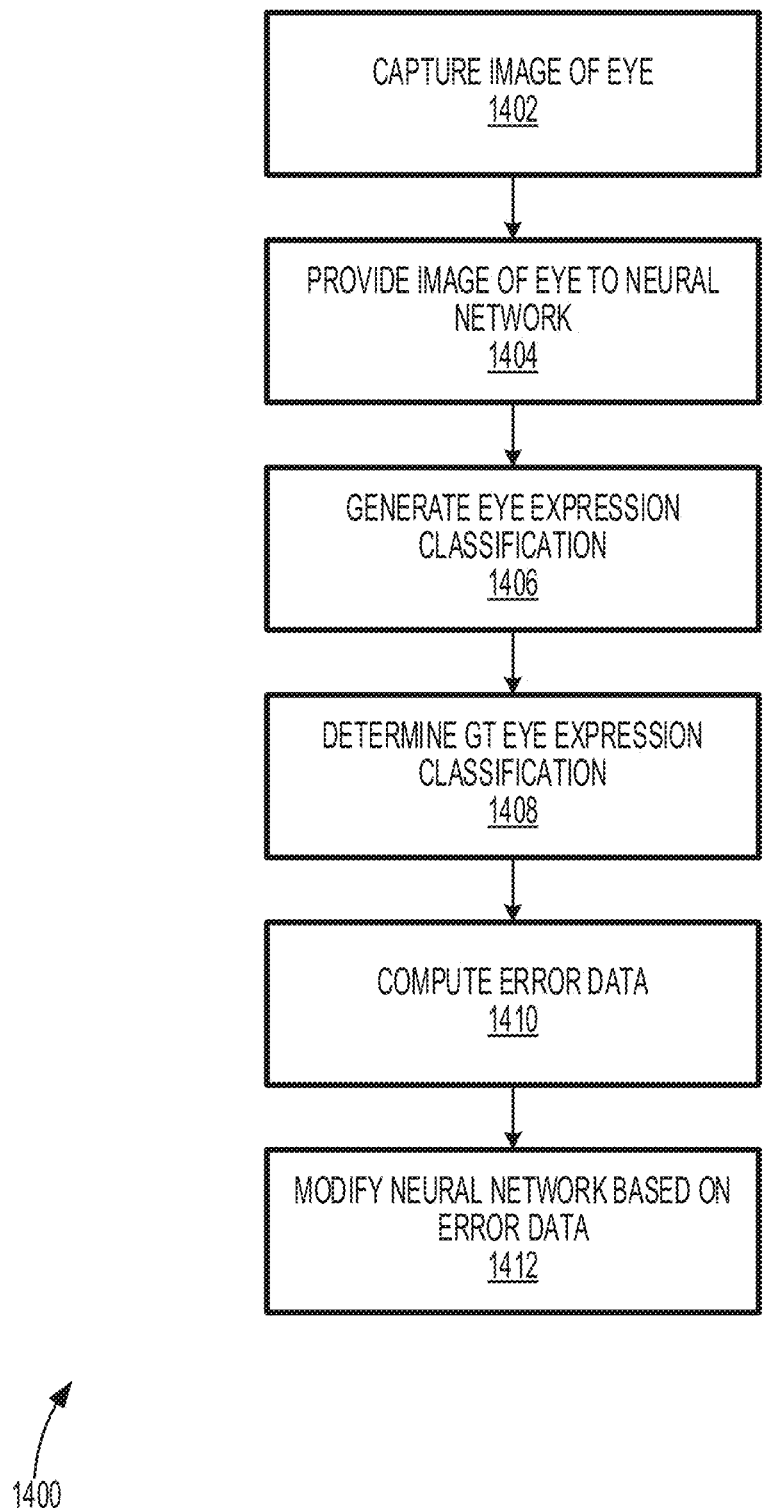
FIG. 14 illustrates a method of training a neural network for classifying user eye expression.

FIG. 14 illustrates a method 1400 of training a neural network (e.g., multi-task neural network 256) for classifying user eye expression. Steps of method 1400 need not be performed in the order shown, and one or more steps of method 1400 may be omitted during performance of method 1400. In some embodiments, one or more steps of method 1400 may be performed by processing module 250 or some other component of AR device 200.

At step 1402, an image of an eye (e.g., input image I(x,y,c)) is captured. In some embodiments, the first image is captured by and/or received from a camera (e.g., off-axis camera 260). In some embodiments, method 1400 includes the step of capturing, using the camera, the image of the eye. In some embodiments, method 1400 includes the step of sending the image of the eye from the camera to a processing module (e.g., processing module 250).

At step 1404, the image of the eye is provided to the neural network. In some embodiments, providing the image of the eye to the neural network may include providing data representing the image of the eye as input to a set of operations that implement the neural network.

At step 1406, an eye expression classification (e.g., eye expression classification 298) corresponding to the eye is generated by the neural network. In some embodiments, the eye expression classification is one of a plurality of possible eye expression classifications.

At step 1408, a GT eye expression classification (e.g., GT data 268) is determined. In some embodiments, determining the GT eye expression classification includes receiving user input indicating to the GT eye expression classification. For example, a user may indicate that they exhibited a "happy" expression through an input device. In some embodiments, determining the GT eye expression classification includes determining that an instruction that is communicated to a user indicates the Gt eye expression classification. For example, a user may be instructed to exhibit a "happy" facial expression through a display device.

At step 1410, error data (e.g., error data 270) is computed based on a difference between the eye expression classification and the GT eye expression classification.

At step 1412, the neural network is modified based on the error data. In some embodiments, modifying the neural network includes modifying a set of weights of the neural network. In some embodiments, the set of weights may be modified using backpropagation. In some embodiments, a set of task specific layers (e.g., task-specific layers 294-6) of the neural network may be modified based on the error data.

Figure 15:
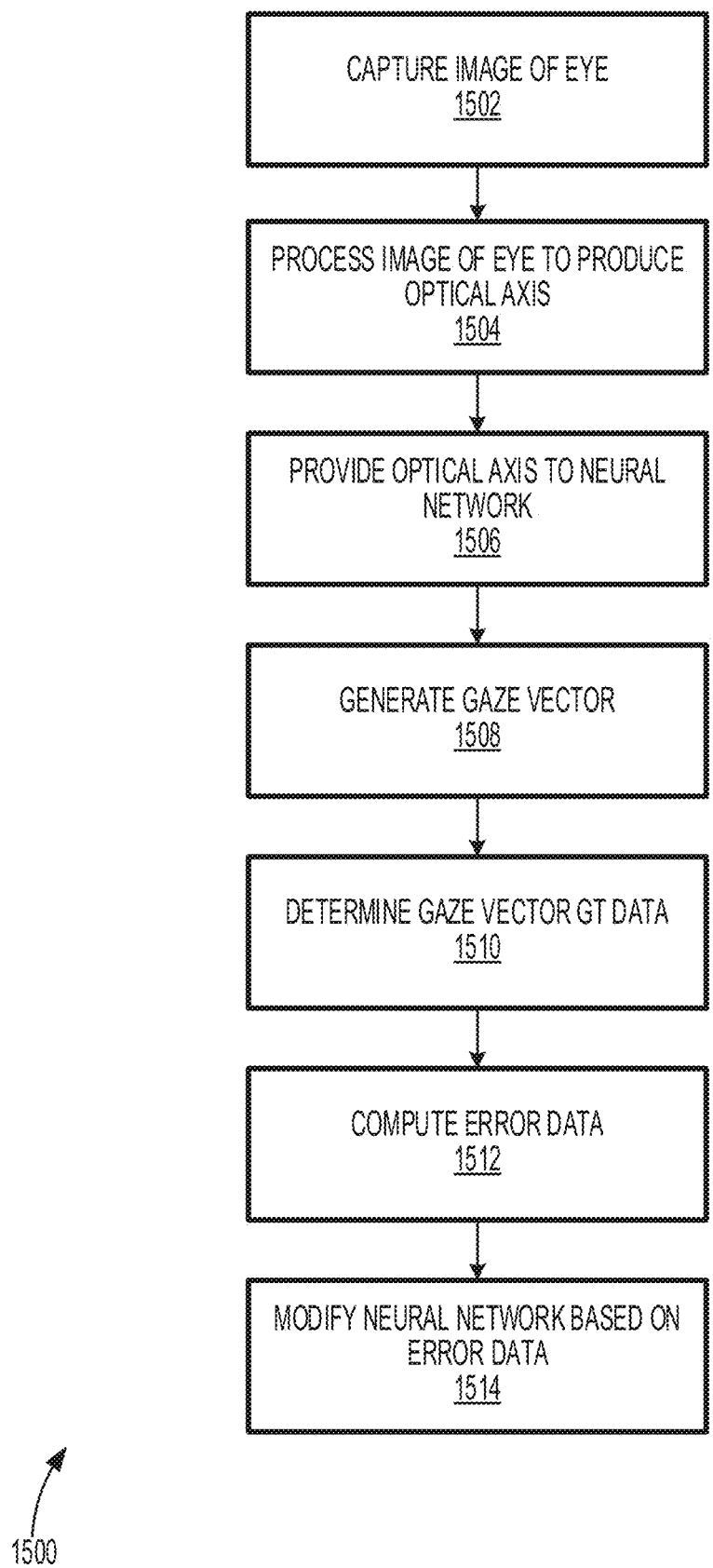
FIG. 15 illustrates a method of training a neural network for computing a gaze vector.

FIG. 15 illustrates a method 1500 of training a neural network (e.g., gaze vector neural network 1102) for computing a gaze vector (e.g., gaze vector 238). Steps of method 1500 need not be performed in the order shown, and one or more steps of method 1500 may be omitted during performance of method 1500. In some embodiments, one or more steps of method 1500 may be performed by processing module 250 or some other component of AR device 200.

At step 1502, an image of an eye (e.g., input image I(x,y,c)) is captured. In some embodiments, the first image is captured by and/or received from a camera (e.g., off-axis camera 260). In some embodiments, method 1500 includes the step of capturing, using the camera, the image of the eye. In some embodiments, method 1500 includes the step of sending the image of the eye from the camera to a processing module (e.g., processing module 250).

At step 1504, the image of the eye is processed to produce an optical axis corresponding to the eye. In some embodiments, processing the image of the eye may include generating, using a multi-task neural network (e.g., multi-task neural network 256), 2D pupil center data (e.g., 2D pupil center data 274), eye segmentation data (e.g., eye segmentation data 276), and/or cornea center data (e.g., cornea center data 280).

At step 1506, the optical axis is provided to the neural network. In some embodiments, providing the optical axis to the neural network may include providing data representing the optical axis as input to a set of operations that implement the neural network.

At step 1508, the gaze vector corresponding to the eye is generated by the neural network. In some embodiments, the gaze vector includes at least one angle.

At step 1510, gaze vector GT data (e.g., gaze vector GT data 1104) is determined. In some embodiments, the gaze vector GT data is determined based on a location at which a target is displayed on a screen. In some embodiments, determining the gaze vector GT data includes receiving user input indicating the gaze vector GT data. For example, a user may look at a particular target of a plurality of targets displayed on a screen and provide input as to which target the user looked at.

At step 1512, error data (e.g., error data 1106) is computed based on a difference between the gaze vector and the gaze vector GT data.

At step 1514, the neural network is modified based on the error data. In some embodiments, modifying the neural network includes modifying a set of weights of the neural network. In some embodiments, the set of weights may be modified using backpropagation.

Figure 16:
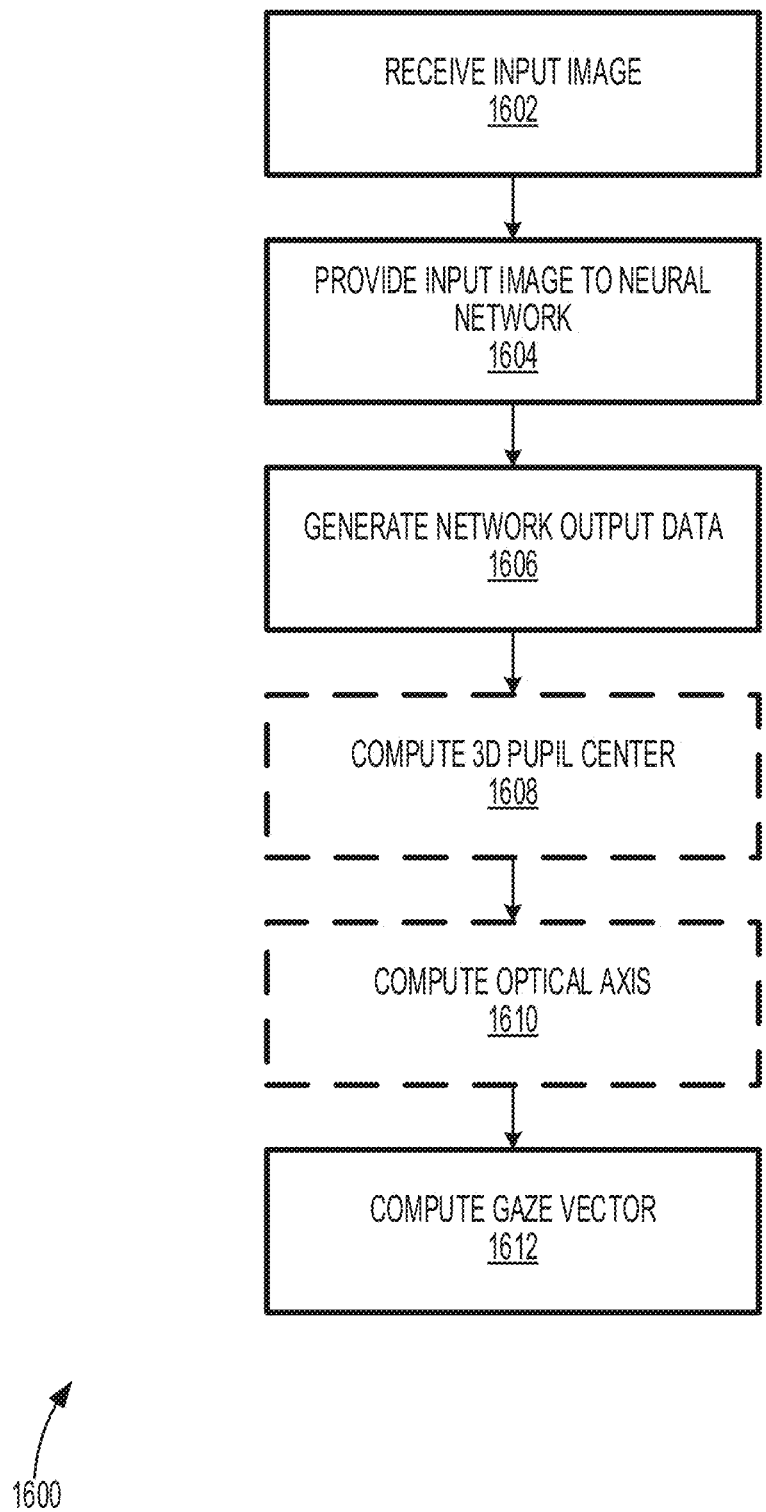
FIG. 16 illustrates a method of computing a gaze vector using a neural network.

FIG. 16 illustrates a method 1600 of computing a gaze vector using a neural network. Steps of method 1600 need not be performed in the order shown, and one or more steps of method 1600 may be omitted during performance of method 1600. In some embodiments, one or more steps of method 1600 may be performed by processing module 250 or some other component of AR device 200.

At step 1602, an input image (e.g., input image I(x,y,c)) of an eye of a user is received. In some embodiments, the input image is received from a camera (e.g., off-axis camera 260). The camera may be mounted to an optical device and/or may be a component of the optical device. In some embodiments, method 1600 includes the step of capturing, using the camera, the input image of the eye of the user. In some embodiments, method 1600 includes the step of sending the input image from the camera to a processing module (e.g., processing module 250).

At step 1604, the input image of the eye is provided to a neural network (e.g., multi-task neural network 256). In some embodiments, the input image is provided to a processor that implements the neural network. The processor may be a special-purpose processor (e.g., a neural network processor) having an architecture that allows certain operations that are commonly performed by neural networks (e.g., convolutions, matrix multiplications) to be performed faster than with a general-purpose processor. For example, the special-purpose processor may include a systolic array having multiple processing elements for performing various arithmetic operations concurrently or simultaneously on different pixels of the input image.

At step 1606, network output data (e.g., network output data 264) is generated using the neural network. The network output data may include data corresponding to an overall output of the neural network, as well as outputs of intermediary layers of the neural network. For example, the network output data may include certain data (e.g., eye segmentation data 276) that is derived from the overall output of the neural network and certain data (e.g., blink prediction 296 and cornea center data 280) that is derived from the output of an intermediary layer of the neural network. Additionally or alternatively, the network output data may include certain data (e.g., glint detection data 278 and 2D pupil center data 274) that is derived from the output of a different intermediary layer of the neural network as well as one or more additional layers that are not involved in the processing of the overall output of the neural network.

At step 1608, a 3D pupil center (e.g., 3D pupil center 292) is computed based on the network output data. In some embodiments, the 3D pupil center is computed based on the 2D pupil data and the eye segmentation data.

At step 1610, an optical axis (e.g., optical axis 310) associated with the eye of the user is computed based on the network output data. In some embodiments, the optical axis is computed based on the 3D pupil center and certain data (e.g., cornea center data 280) of the network output data.

At step 1612, a gaze vector (e.g., gaze vector 238) corresponding to the eye is computed based on the network output data. In some embodiments, the gaze vector is computed only using certain components of the network output data (e.g., 2D pupil center data 274, eye segmentation data 276, and cornea center data 280) while other components of the network output data (e.g., glint detection data 278) are not used in the computation. In some embodiments, computing the gaze vector may include one or more post-processing steps. For example, a 3D pupil center (e.g., 3D pupil center 292) may first be computed based on one or more components of the network output data (e.g., 2D pupil center data 274 and eye segmentation data 276). Second, an optical axis (e.g., optical axis 310) may be computed based on the 3D pupil center and an additional component of the network output data (e.g., cornea center data 280). Next, the gaze vector may be computed based on the optical axis and a calibration angle corresponding to a user.

Figure 17:
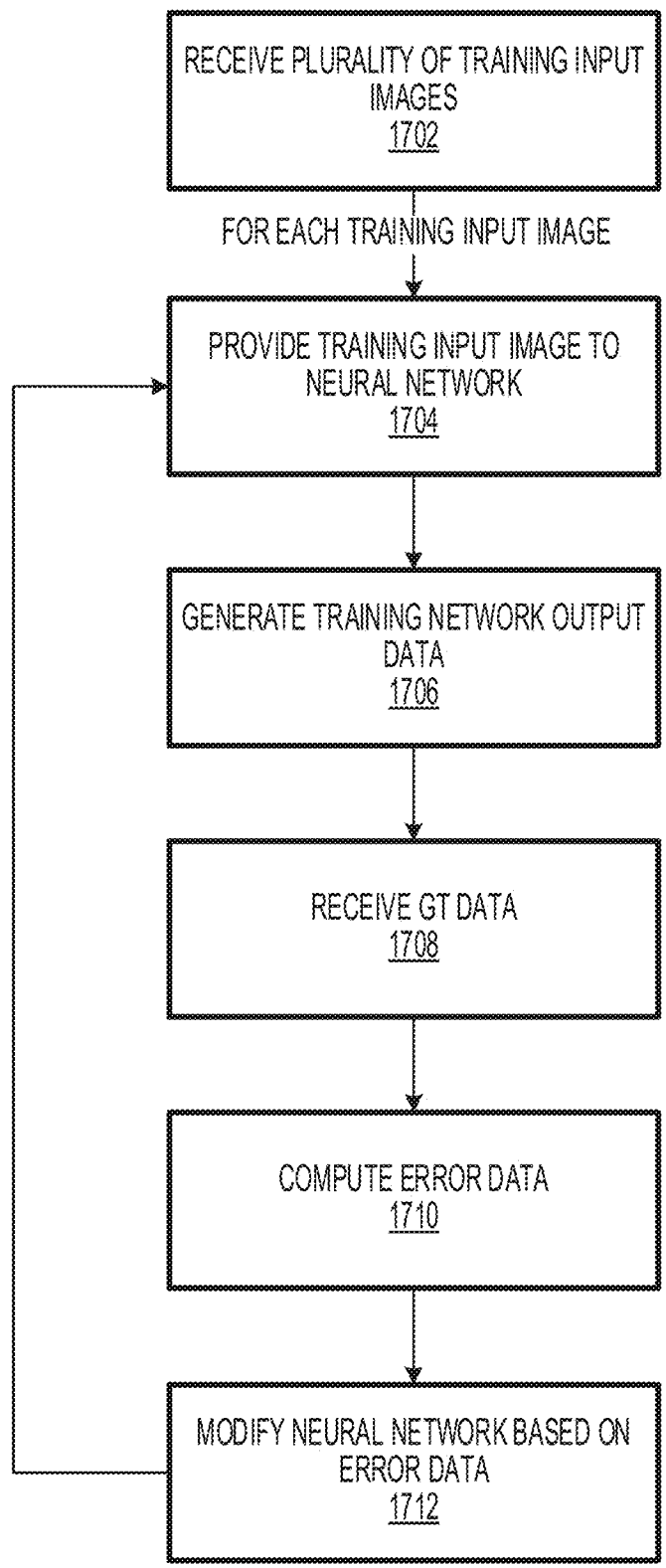
FIG. 17 illustrates a method of training a neural network.

FIG. 17 illustrates a method 1700 of training a neural network. Steps of method 1700 need not be performed in the order shown, and one or more steps of method 1700 may be omitted during performance of method 1700. In some embodiments, one or more steps of method 1700 may be performed by processing module 250 or some other component of AR device 200.

At step 1702, a plurality of training input images (e.g., input image I(x,y,c)) are received. The plurality of training input images may be received from a camera (e.g., off-axis camera 260) or may be artificially generated or retrieved for purposes of training. Each of the plurality of training images may be images of eyes. Step 1702 may be similar to step 1602.

Steps 1704 to 1712 may be performed for each training input image of the plurality of training input images. At step 1704, the training input image is provided to a neural network (e.g., multi-task neural network 256). Step 1704 may be similar to step 1604.

At step 1706, training network output data (e.g., network output data 264) is generated using the neural network. Step 1706 may be similar to step 1606.

At step 1708, GT data is received (e.g., GT data 268) from a user input device. The GT data may include one or more components (e.g., 2D pupil center GT data 283, eye segmentation GT data 284, glint detection GT data 286) that correspond to one or more components of the training network output data.

At step 1710, error data (e.g., error data 270) is computed based on a difference between the training network output data and the GT data. The error data may include one or more components (e.g., first error data 270A, second error data 270B, third error data 270C, fourth error data 270D) that correspond to one or more components of the GT data and/or the training network output data.

At step 1712, the neural network is modified based on the error data. In some embodiments, the magnitude of the modification to the neural network is proportional to the magnitude of the error data, such that larger differences between the training network output data and the GT data may correspond to larger modifications to the neural network. In some embodiments, the neural network may be trained using a backpropagation algorithm that calculates one or more weight updates to the weights of the neural network.

Figure 18:
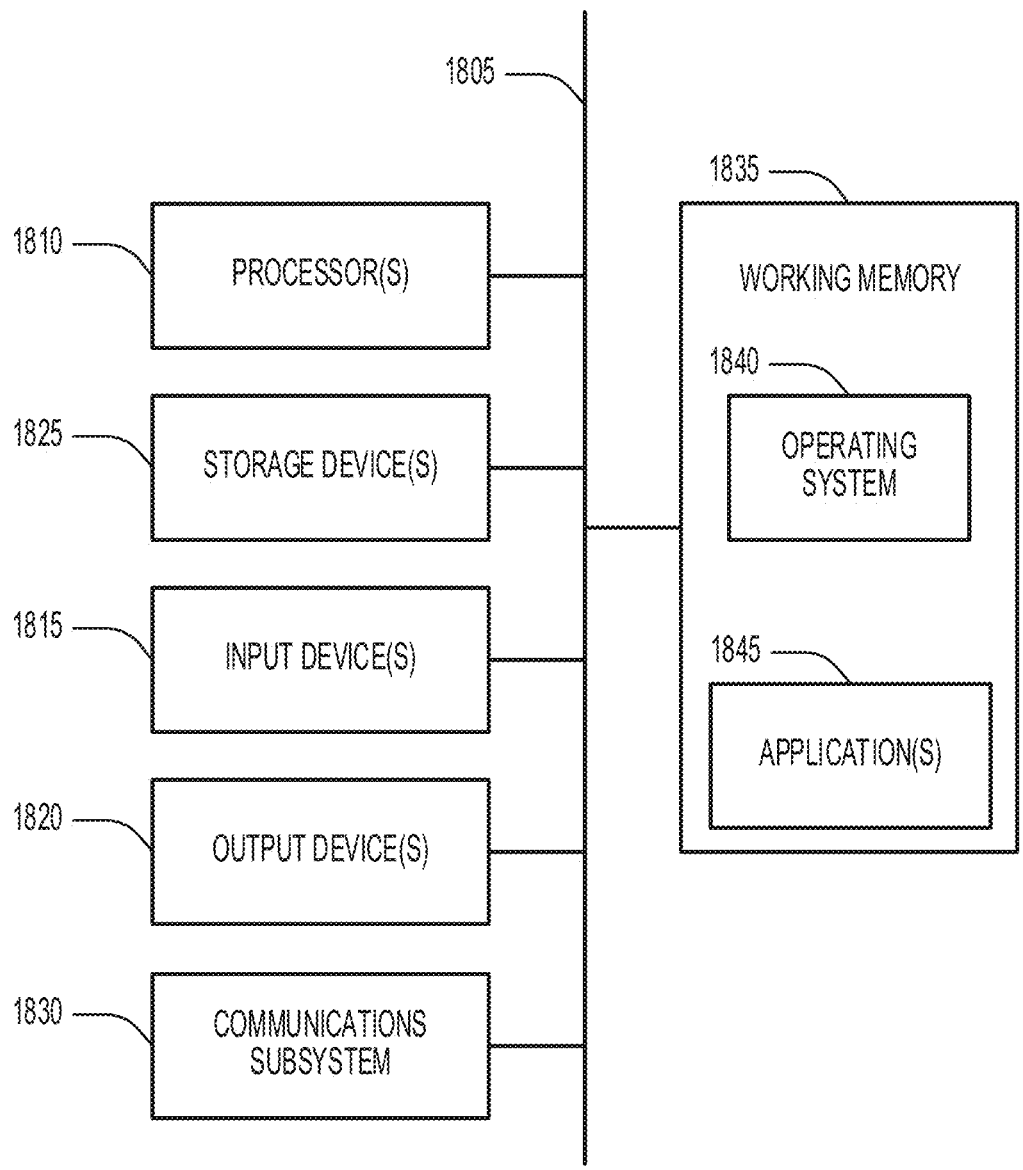
FIG. 18 illustrates a simplified computer system.

FIG. 18 illustrates a simplified computer system 1800 according to an embodiment described herein. Computer system 1800 as illustrated in FIG. 18 may be incorporated into devices such as AR device 200 as described herein. FIG. 18 provides a schematic illustration of one embodiment of computer system 1800 that can perform some or all of the steps of the methods provided by various embodiments. It should be noted that FIG. 18 is meant only to provide a generalized illustration of various components, any or all of which may be utilized as appropriate. FIG. 18, therefore, broadly illustrates how individual system elements may be implemented in a relatively separated or relatively more integrated manner.

Computer system 1800 is shown comprising hardware elements that can be electrically coupled via a bus 1805, or may otherwise be in communication, as appropriate. The hardware elements may include one or more processors 1810, including without limitation one or more general-purpose processors and/or one or more special-purpose processors such as digital signal processing chips, graphics acceleration processors, and/or the like; one or more input devices 1815, which can include without limitation a mouse, a keyboard, a camera, and/or the like; and one or more output devices 1820, which can include without limitation a display device, a printer, and/or the like.

Computer system 1800 may further include and/or be in communication with one or more non-transitory storage devices 1825, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

Computer system 1800 might also include a communications subsystem 1830, which can include without limitation a modem, a network card (wireless or wired), an infrared communication device, a wireless communication device, and/or a chipset such as a Bluetooth™ device, an 802.11 device, a WiFi device, a WiMax device, cellular communication facilities, etc., and/or the like. The communications subsystem 1830 may include one or more input and/or output communication interfaces to permit data to be exchanged with a network such as the network described below to name one example, other computer systems, television, and/or any other devices described herein. Depending on the desired functionality and/or other implementation concerns, a portable electronic device or similar device may communicate image and/or other information via the communications subsystem 1830. In other embodiments, a portable electronic device, e.g. the first electronic device, may be incorporated into computer system 1800, e.g., an electronic device as an input device 1815. In some embodiments, computer system 1800 will further comprise a working memory 1835, which can include a RAM or ROM device, as described above.

Computer system 1800 also can include software elements, shown as being currently located within the working memory 1835, including an operating system 1840, device drivers, executable libraries, and/or other code, such as one or more application programs 1845, which may comprise computer programs provided by various embodiments, and/or may be designed to implement methods, and/or configure systems, provided by other embodiments, as described herein. Merely by way of example, one or more procedures described with respect to the methods discussed above, might be implemented as code and/or instructions executable by a computer and/or a processor within a computer; in an aspect, then, such code and/or instructions can be used to configure and/or adapt a general purpose computer or other device to perform one or more operations in accordance with the described methods.

A set of these instructions and/or code may be stored on a non-transitory computer-readable storage medium, such as the storage device(s) 1825 described above. In some cases, the storage medium might be incorporated within a computer system, such as computer system 1800. In other embodiments, the storage medium might be separate from a computer system e.g., a removable medium, such as a compact disc, and/or provided in an installation package, such that the storage medium can be used to program, configure, and/or adapt a general purpose computer with the instructions/code stored thereon. These instructions might take the form of executable code, which is executable by computer system 1800 and/or might take the form of source and/or installable code, which, upon compilation and/or installation on computer system 1800 e.g., using any of a variety of generally available compilers, installation programs, compression/decompression utilities, etc., then takes the form of executable code.

It will be apparent to those skilled in the art that substantial variations may be made in accordance with specific requirements. For example, customized hardware might also be used, and/or particular elements might be implemented in hardware, software including portable software, such as applets, etc., or both. Further, connection to other computing devices such as network input/output devices may be employed.

As mentioned above, in one aspect, some embodiments may employ a computer system such as computer system 1800 to perform methods in accordance with various embodiments of the technology. According to a set of embodiments, some or all of the procedures of such methods are performed by computer system 1800 in response to processor 1810 executing one or more sequences of one or more instructions, which might be incorporated into the operating system 1840 and/or other code, such as an application program 1845, contained in the working memory 1835. Such instructions may be read into the working memory 1835 from another computer-readable medium, such as one or more of the storage device(s) 1825. Merely by way of example, execution of the sequences of instructions contained in the working memory 1835 might cause the processor(s) 1810 to perform one or more procedures of the methods described herein. Additionally or alternatively, portions of the methods described herein may be executed through specialized hardware.

The terms "machine-readable medium" and "computer-readable medium," as used herein, refer to any medium that participates in providing data that causes a machine to operate in a specific fashion. In an embodiment implemented using computer system 1800, various computer-readable media might be involved in providing instructions/code to processor(s) 1810 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 1825. Volatile media include, without limitation, dynamic memory, such as the working memory 1835.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 1810 for execution. Merely by way of example, the instructions may initially be carried on a magnetic disk and/or optical disc of a remote computer. A remote computer might load the instructions into its dynamic memory and send the instructions as signals over a transmission medium to be received and/or executed by computer system 1800.

The communications subsystem 1830 and/or components thereof generally will receive signals, and the bus 1805 then might carry the signals and/or the data, instructions, etc. carried by the signals to the working memory 1835, from which the processor(s) 1810 retrieves and executes the instructions. The instructions received by the working memory 1835 may optionally be stored on a non-transitory storage device 1825 either before or after execution by the processor(s) 1810.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a schematic flowchart or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes a plurality of such users, and reference to "the processor" includes reference to one or more processors and equivalents thereof known to those skilled in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method of training a neural network, the method comprising:
   performing a first training step including:
      providing a first image of a first eye to the neural network as input, the neural network having a set of feature encoding layers connected to a plurality of sets of task-specific layers, the plurality of sets of task-specific layers including at least three sets of task-specific layers that operate on an output generated by the set of feature encoding layers, the plurality of sets of task-specific layers including:
         a first set of task-specific layers that output two-dimensional (2D) pupil data,
         a second set of task-specific layers that output eye segmentation data that includes a segmentation of an eye into a plurality of regions including one or more of a background region, a sclera region, a pupil region, or an iris region, and
         a third of task-specific layers that output cornea center data;
      generating, using the set of feature encoding layers and the second set of task-specific layers of the neural network and based on the first image of the first eye as input, eye segmentation data for the first eye that includes a segmentation of the first eye into the plurality of regions; and
      training the set of feature encoding layers using the eye segmentation data for the first eye by modifying weights associated with the set of feature encoding layers; and
   performing a second training step including:
      providing a second image of a second eye to the neural network as input;
      generating, using the set of feature encoding layers, the first set of task specific layers, and the third set of task-specific layers of the neural network and based on the second image of the second eye as input, network output data including 2D pupil data corresponding to the second eye and cornea center data corresponding to the second eye; and
      training the plurality of sets of task-specific layers using the network output data by modifying weights associated with the plurality of sets of task-specific layers;
   wherein the neural network is trained such that the set of feature encoding layers are trained during the first training step but are held fixed during the second training step.

2. The method of claim 1, wherein the first training step is performed during a first time duration and the second training step is performed during a second time duration that is after the first time duration.

3. The method of claim 1, wherein the plurality of regions includes one or more of a background region, a sclera region, a pupil region, or an iris region.

4. The method of claim 1, wherein performing the first training step further includes:
training the second set of task-specific layers using the eye segmentation data for the first eye.

5. The method of claim 1, wherein performing the first training step further includes:
receiving eye segmentation ground truth (GT) data; and
comparing the eye segmentation data to the eye segmentation GT data.

6. The method of claim 1, wherein the network output data includes glint detection data corresponding to the second eye.

7. The method of claim 1, wherein the network output data includes a blink prediction corresponding to the second eye.

8. The method of claim 1, wherein the network output data includes an eye expression classification corresponding to the second eye.

9. The method of claim 1, wherein the network output data includes eye segmentation data for the second eye that includes a second segmentation of the second eye into the plurality of regions.

10. A non-transitory computer-readable medium comprising instructions that, when executed by one or more processors, cause the one or more processors to perform operations for training a neural network, wherein the operations comprise:
performing a first training step including:
providing a first image of a first eye to the neural network as input, the neural network having a set of feature encoding layers connected to a plurality of sets of task-specific layers, the plurality of sets of task-specific layers including at least three sets of task-specific layers that operate on an output generated by the set of feature encoding layers, the plurality of sets of task-specific layers including:
a first set of task-specific layers that output two-dimensional (2D) pupil data,
a second set of task-specific layers that output eye segmentation data that includes a segmentation of an eye into a plurality of regions including one or more of a background region, a sclera region, a pupil region, or an iris region, and
a third of task-specific layers that output cornea center data;
generating, using the set of feature encoding layers and the second set of task-specific layers of the neural network and based on the first image of the first eye as input, eye segmentation data for the first eye that includes a segmentation of the first eye into the plurality of regions; and
training the set of feature encoding layers using the eye segmentation data for the first eye by modifying weights associated with the set of feature encoding layers; and
performing a second training step including:
providing a second image of a second eye to the neural network as input;
generating, using the set of feature encoding layers, the first set of task specific layers, and the third set of task-specific layers of the neural network and based on the second image of the second eye as input, network output data including 2D pupil data corresponding to the second eye and cornea center data corresponding to the second eye; and
training the plurality of sets of task-specific layers using the network output data by modifying weights associated with the plurality of sets of task-specific layers;
wherein the neural network is trained such that the set of feature encoding layers are trained during the first training step but are held fixed during the second training step.

11. The non-transitory computer-readable medium of claim 10, wherein the first training step is performed during a first time duration and the second training step is performed during a second time duration that is after the first time duration.

12. A system comprising:
one or more processors; and
a non-transitory computer-readable medium comprising instructions that, when executed by the one or more processors, cause the one or more processors to perform operations for training a neural network, wherein the operations comprise:
performing a first training step including:
providing a first image of a first eye to the neural network as input, the neural network having a set of feature encoding layers connected to a plurality of sets of task-specific layers, the plurality of sets of task-specific layers including at least three sets of task-specific layers that operate on an output generated by the set of feature encoding layers, the plurality of sets of task-specific layers including:
a first set of task-specific layers that output two-dimensional (2D) pupil data,
a second set of task-specific layers that output eye segmentation data that includes a segmentation of an eye into a plurality of regions including one or more of a background region, a sclera region, a pupil region, or an iris region, and
a third of task-specific layers that output cornea center data;
generating, using the set of feature encoding layers and the second set of task-specific layers of the neural network and based on the first image of the first eye as input, eye segmentation data for the first eye that includes a segmentation of the first eye into the plurality of regions; and
training the set of feature encoding layers using the eye segmentation data for the first eye by modifying weights associated with the set of feature encoding layers; and
performing a second training step including:
providing a second image of a second eye to the neural network as input;
generating, using the set of feature encoding layers, the first set of task specific layers, and the third set of task-specific layers of the neural network and based on the second image of the second eye as input, network output data including 2D pupil data corresponding to the second eye and cornea center data corresponding to the second eye; and
training the plurality of sets of task-specific layers using the network output data by modifying weights associated with the plurality of sets of task-specific layers;

wherein the neural network is trained such that the set of feature encoding layers are trained during the first training step but are held fixed during the second training step.

13. The system of claim 12, wherein the first training step is performed during a first time duration and the second training step is performed during a second time duration that is after the first time duration.

14. The system of claim 12, wherein the plurality of regions includes one or more of a background region, a sclera region, a pupil region, or an iris region.

* * * * *